US012194527B2

(12) United States Patent
Nishi et al.

(10) Patent No.: US 12,194,527 B2
(45) Date of Patent: Jan. 14, 2025

(54) CLAMP DEVICE AND PROCESSING MACHINE

(71) Applicant: DMG MORI CO., LTD., Nara (JP)

(72) Inventors: Syuichi Nishi, Nara (JP); Takeshi Otawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 281 days.

(21) Appl. No.: 17/920,261

(22) PCT Filed: Apr. 24, 2020

(86) PCT No.: PCT/JP2020/017784
§ 371 (c)(1),
(2) Date: Oct. 20, 2022

(87) PCT Pub. No.: WO2021/215003
PCT Pub. Date: Oct. 28, 2021

(65) Prior Publication Data
US 2023/0173568 A1     Jun. 8, 2023

(51) Int. Cl.
*B21D 37/14*     (2006.01)
(52) U.S. Cl.
CPC .................................... *B21D 37/14* (2013.01)

(58) Field of Classification Search
CPC ........ B21D 37/14; B21D 5/02; B23Q 1/0072; B23Q 3/155; B23Q 2003/1558
See application file for complete search history.

(56) References Cited

U.S. PATENT DOCUMENTS 4,713,876 A    *    12/1987    Takagi ................... B23Q 3/157
483/32
2018/0043487 A1*    2/2018    Demmeler ......... B23Q 3/15706

FOREIGN PATENT DOCUMENTS

JP         2016215218 A     12/2016

* cited by examiner

*Primary Examiner* — Teresa M Ekiert
(74) *Attorney, Agent, or Firm* — IP Business Solutions, LLC.

(57) ABSTRACT

A clamp device includes: a tool spindle including a protrusion; an additive-manufacturing head having a recess into which the protrusion is inserted in a first direction, the additive-manufacturing head being detachably coupled to the tool spindle; and a clamp mechanism portion that clamps mutually the recess and the protrusion inserted into the recess. The additive-manufacturing head includes a pin member. A pin insertion hole into which the pin member is inserted in a second direction intersecting the first direction is made in the tool spindle.

5 Claims, 16 Drawing Sheets

CLAMP DEVICE AND PROCESSING MACHINE

TECHNICAL FIELD

The present invention relates to a clamp device and a processing machine.

BACKGROUND ART

For example, Japanese Patent Laying-Open No. 2016-215218 discloses an upper die holder including a holder body including an upper die support, a clamp member that includes a lower portion and is fastened to the holder body, and an upper die held between the upper die support and the lower portion by the clamp member. A fall prevention key is provided in the clamp member. A fall prevention groove into which the fall prevention key is inserted is provided in the upper die.

CITATION LIST

Patent Literature

PTL 1: Japanese Patent Laying-Open No. 2016-215218

SUMMARY OF INVENTION

Technical Problem

In the upper die holder disclosed in PTL 1 described above, an engagement structure of the fall prevention key with respect to the fall prevention groove is used to prevent the fall of the upper die. However, when clamping failure is generated in the clamp member, there is some possibility that the fall prevention key comes out of the fall prevention groove. In this case, falling of the upper die cannot be reliably prevented.

An object of the present invention is to solve the above problems, and an object of the present invention is to provide a clamp device capable of more reliably maintaining coupling between members when the clamping failure is generated, and a processing machine including the clamp device.

Solution to Problem

A clamp device according to the present invention includes: a first member including a protrusion; a second member having a recess into which the protrusion is inserted in a first direction, the second member being detachably coupled to the first member; and a clamp mechanism portion that mutually clamps the recess and the protrusion inserted into the recess. One member of the first member and the second member includes a pin member. A pin insertion hole into which the pin member is inserted in the second direction intersecting the first direction is made in the other member of the first member and the second member.

According to the clamp device configured as described above, the second direction that is the insertion direction of the pin member with respect to the pin insertion hole is the direction intersecting the first direction that is the insertion direction of the protrusion with respect to the recess, so that the pin member inserted into the pin insertion hole can be caused to function as a retainer even when clamping failure is generated in the clamp mechanism portion that mutually clamps the recess and the protrusion inserted into the recess. Thus, the protrusion can be prevented from coming out of the recess, and the coupling between the first member and the second member can be more reliably maintained.

Preferably, the second direction is orthogonal to the first direction.

According to the clamp device configured as described above, the second direction that is the insertion direction of the pin member with respect to the pin insertion hole is the direction orthogonal to the first direction that is the insertion direction of the protrusion with respect to the recess, so that the pin member inserted into the pin insertion hole can function as the retainer.

Preferably, the first member includes a first protrusion and a second protrusion as the protrusions. A first recess into which the first protrusion is inserted and a second recess into which the second protrusion is inserted are provided as the recess in the second member. The pin member and the pin insertion hole are disposed on a straight line connecting the first protrusion and the first recess, and the second protrusion and the second recess.

According to the clamp device configured as described above, the pin member inserted into the pin insertion hole can more reliably prevent both the first protrusion from coming out of the first recess and prevent the second protrusion from coming out of the second recess.

Preferably, the one member includes a first mating surface extending along the first direction. The other member has a second mating surface that extends along the first direction and faces the first mating surface. The pin member is provided so as to be movable forward and backward between a first state in which the pin member is disposed on the back side of the first mating surface and a second state in which the pin member protrudes from the first mating surface. The pin insertion hole opens to the second mating surface.

According to the clamp device configured as described above, the protrusion is inserted into the recess while the pin member is set to in the first state, so that the first mating surface and the second mating surface face each other. At this point, the first mating surface and the second mating surface extend along the first direction that is the insertion direction of the protrusion with respect to the recess, so that the first mating surface and the second mating surface can be prevented from interfering with each other. When the pin member is operated from the first state to the second state while the first mating surface and the second mating surface face each other, so that the pin member can be inserted into the pin insertion hole.

Preferably, one of the first member and the second member is a tool spindle. The other of the first member and the second member is an additive-manufacturing head detachably attached to the tool spindle.

According to the clamp device configured as described above, even when the clamping failure is generated in the clamp mechanism portion, the coupling between the tool spindle and additive-manufacturing head can be more reliably maintained.

A processing machine according to the present invention includes the clamp device according to any one of the above.

According to the processing machine configured as described above, the processing machine including the clamp device capable of more reliably maintaining the coupling between the first member and the second member can be implemented.

Advantageous Effects of Invention

As described above, according to the present invention, the clamp device capable of more reliably maintaining the coupling between members when the clamping failure is generated and the processing machine including such the clamp device can be provided.

DESCRIPTION OF EMBODIMENT

Figure 1:
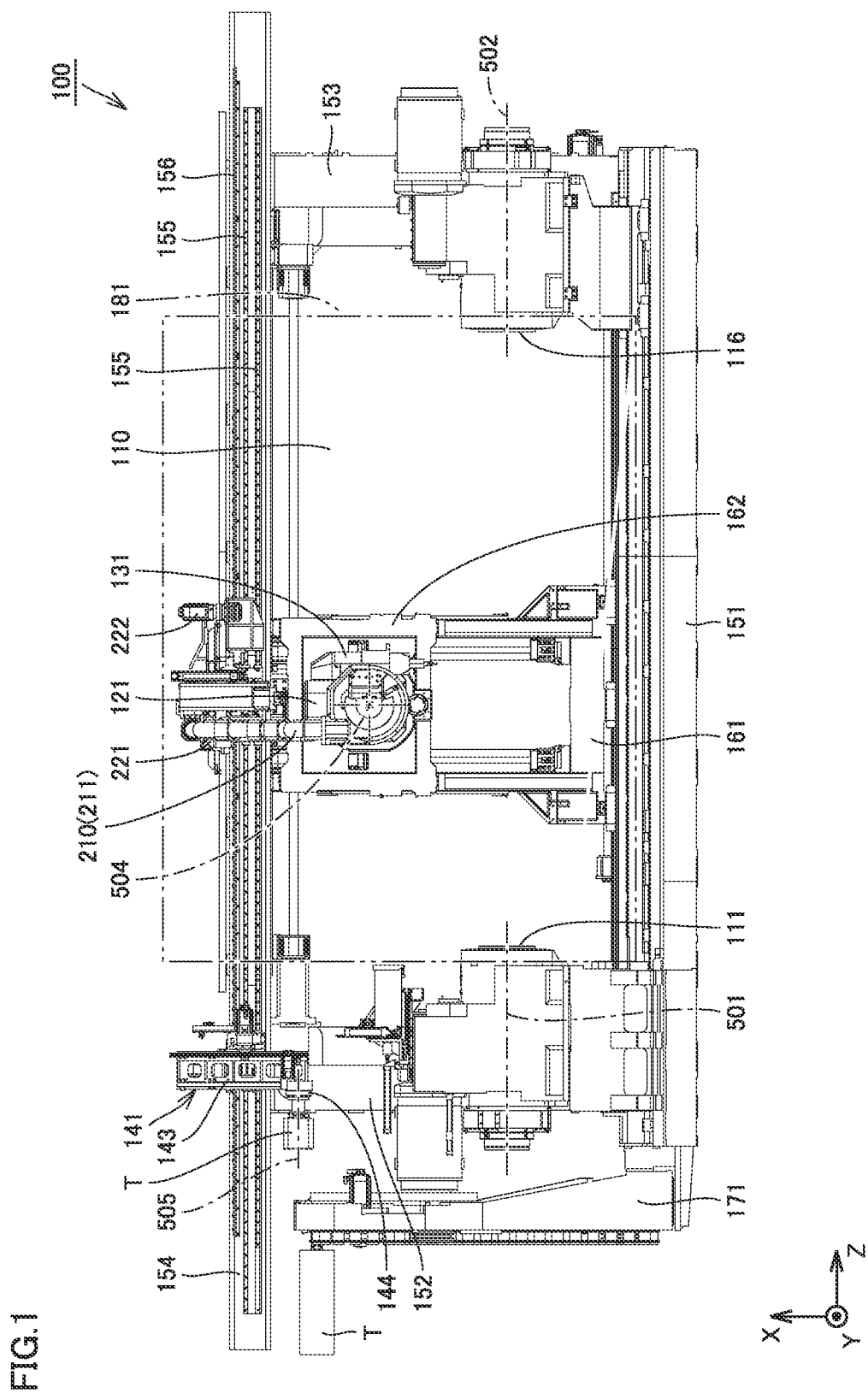
FIG. 1 is a front view illustrating a processing machine according to an embodiment of the present invention.

An embodiment of the present invention will be described with reference to the drawings. In the drawings referred to below, the same or corresponding member is denoted by the same reference numeral.

Figure 2:
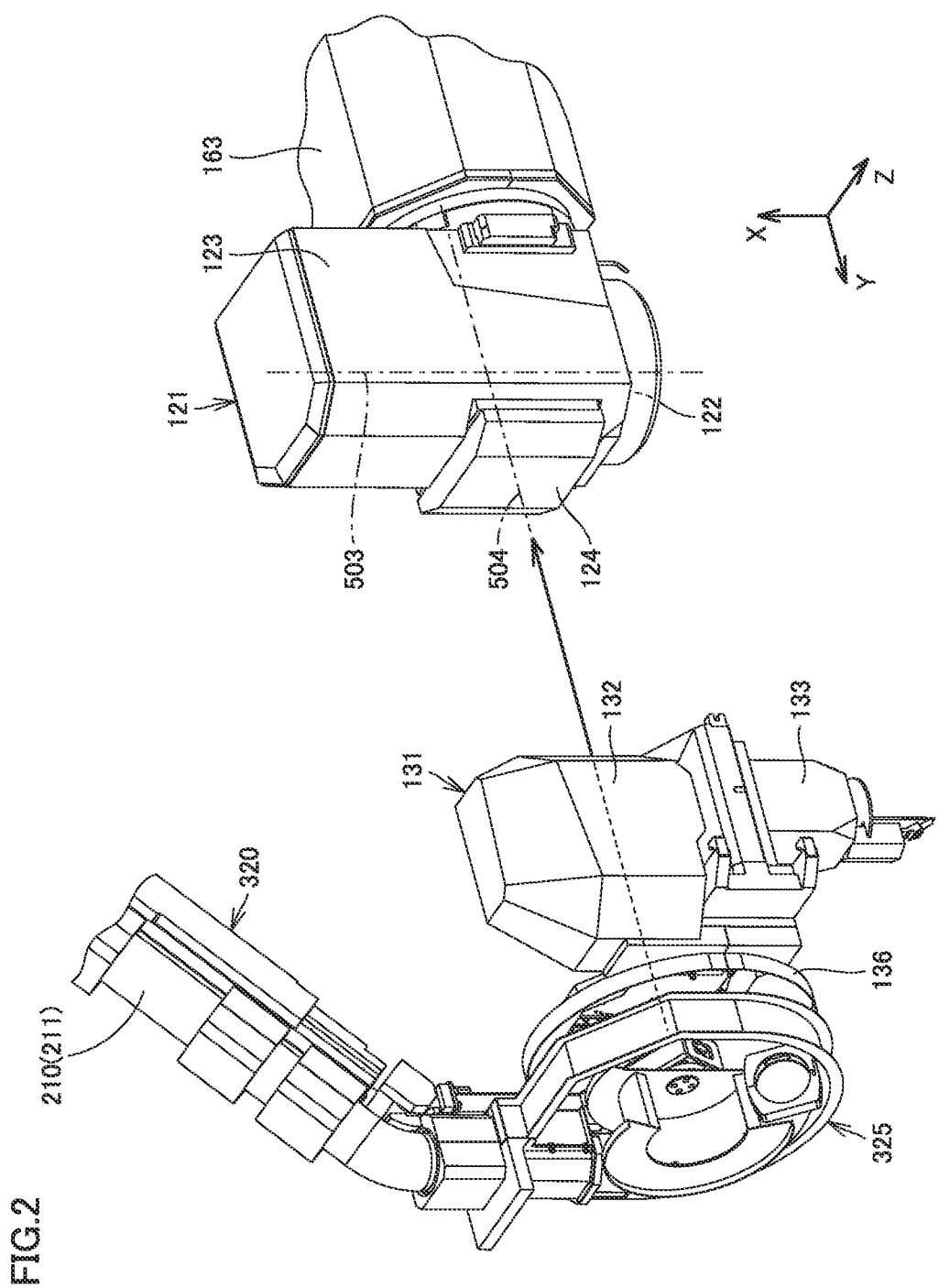
FIG. 2 is a perspective view illustrating attachment and detachment of a tool spindle and an additive-manufacturing head in the processing machine in FIG. 1.

FIG. 1 is a front view illustrating a processing machine according to an embodiment of the present invention. In FIG. 1, an inside of the processing machine is illustrated by seeing through a cover body having an appearance of the processing machine. FIG. 2 is a perspective view illustrating attachment and detachment of a tool spindle and an additive-manufacturing head in the processing machine in FIG. 1.

Referring to FIGS. 1 and 2, a processing machine 100 is an AM/SM hybrid processing machine capable of performing additive manufacturing (AM) processing for a workpiece and subtractive manufacturing (SM) processing for a workpiece. Processing machine 100 has a turning function using a stationary tool and a milling function using a rotating tool as a function of SM processing.

Processing machine 100 is a numerically control (NC) processing machine in which various operations for workpiece processing are automated by numerical control of a computer.

In the present specification, an axis parallel to a left-right direction (width direction) of processing machine 100 and extending in a horizontal direction is referred to as a "Z-axis", an axis parallel to a front-rear direction (depth direction) of processing machine 100 and extending in the horizontal direction is referred to as a "Y-axis", and an axis extending in a vertical direction is referred to as an "X-axis". A right direction in FIG. 1 is referred to as "+Z-axis direction", and a left direction is referred to as "−Z-axis direction". In FIG. 1, a front direction of a paper surface is referred to as a "+Y-axis direction", and a back direction is referred to as a "−Y-axis direction". In FIG. 1, an upward direction is referred to as a "+X-axis direction", and a downward direction is referred to as a "−X-axis direction". The X-axis, the Y-axis, and the Z-axis are three axes orthogonal to each other.

First, an overall structure of processing machine 100 will be described. Processing machine 100 includes a splash guard 181. Splash guard 181 defines and forms a processing area 110 where the workpiece is processed.

Processing machine 100 further includes a bed 151, a first workpiece spindle 111, a second workpiece spindle 116, and a tool rest (not illustrated).

Bed 151 is a base member supporting first workpiece spindle 111, second workpiece spindle 116, the tool rest, and the like, and is installed on a floor of a factory or the like.

First workpiece spindle 111 and second workpiece spindle 116 are disposed opposite to each other in the Z-axis direction. First workpiece spindle 111 and second workpiece spindle 116 are configured to be able to hold the workpiece. A chuck mechanism (not illustrated) detachably holding the workpiece is provided in first workpiece spindle 111 and second workpiece spindle 116. First workpiece spindle 111 mainly rotates the held workpiece about a rotation axis 501 parallel to the Z-axis during turning of the workpiece using a fixed tool. Second workpiece spindle 116 mainly rotates the held workpiece about a rotation axis 502 parallel to the Z-axis during the turning of the workpiece using the fixed tool.

First workpiece spindle 111 is fixed to bed 151. Second workpiece spindle 116 is provided to be movable in the Z-axis direction by various feed mechanisms, guide mechanisms, servomotors, and the like. Second workpiece spindle 116 may be configured to be fixed to bed 151. A tailstock supporting the rotation center of the workpiece held by first workpiece spindle 111 may be provided instead of second workpiece spindle 116.

The tool rest (not illustrated) is provided in processing area 110. The tool rest is configured to be able to hold a plurality of fixing tools for workpiece subtractive manufacturing (turning). The tool rest is supported by bed 151 with a saddle or the like (not illustrated) interposed therebetween. The tool rest is provided movably in the X-axis direction and the Z-axis direction by various feed mechanisms, guide mechanisms, servomotors, and the like provided in the saddle or the like. The tool rest may have a milling function for rotating the rotating tool.

Processing machine 100 further includes a first longitudinal frame 152, a second longitudinal frame 153, a first transverse frame 154, and a second transverse frame 311 (see FIG. 3 described later).

First longitudinal frame 152 and second longitudinal frame 153 have a columnar shape in which the X-axis direction (vertical direction) is a longer direction. First longitudinal frame 152 and second longitudinal frame 153 are provided apart from each other in the Z-axis direction. Lower ends of first longitudinal frame 152 and second longitudinal frame 153 are connected to bed 151.

First transverse frame 154 and second transverse frame 311 have a beam shape in which the Z-axis direction (left-right direction) is the longer direction. First transverse frame 154 and second transverse frame 311 are made of a pipe member having a rectangular closed section.

First transverse frame 154 and second transverse frame 311 are provided apart from each other in the Y-axis direction. First transverse frame 154 is provided at a position shifted in the +Y-axis direction from second transverse frame 311. Both ends of first transverse frame 154 in the Z-axis direction are connected to upper ends of first longitudinal frame 152 and second longitudinal frame 153, respectively. Both ends of second transverse frame 311 in the Z-axis direction are connected to upper ends of first longitudinal frame 152 and second longitudinal frame 153, respectively.

First longitudinal frame 152, second longitudinal frame 153, first transverse frame 154, and second transverse frame 311 form a gate-shaped frame structure on bed 151.

Processing machine 100 further includes a saddle 161, a cross slide 162, and a ram 163.

Saddle 161 is supported by bed 151. Saddle 161 is provided on bed 151 and between first longitudinal frame 152 and second longitudinal frame 153 in the Z-axis direction. Saddle 161 has a shape rising upward from bed 151 toward first transverse frame 154 and second transverse frame 311. Saddle 161 is provided to be movable in the Z-axis direction by various feed mechanisms, guide mechanisms, servomotors, and the like provided on bed 151 and the like.

Cross slide 162 is supported by saddle 161. Cross slide 162 has a flat plate shape parallel to the X-axis-Z-axis plane as a whole. Cross slide 162 is attached to a front surface of saddle 161 facing the +Y-axis direction. Cross slide 162 is provided to be movable in the X-axis direction (vertical direction) by various feed mechanisms, guide mechanisms, servomotors, and the like provided on saddle 161 and the like.

Ram 163 is supported by cross slide 162. Ram 163 has a cylindrical shape extending along the Y-axis direction as a whole. Ram 163 is provided so as to penetrate cross slide 162 and to protrude into processing area 110 in the Y-axis direction. Ram 163 is provided movably in the Y-axis direction by various feed mechanisms, guide mechanisms, servomotors, and the like provided on cross slide 162 and the like.

Processing machine 100 further includes a tool spindle 121. Tool spindle 121 is provided in processing area 110. Tool spindle 121 is configured to be able to hold the rotating tool for workpiece subtractive manufacturing (milling). Tool spindle 121 is provided with a clamp mechanism (not illustrated) detachably holding the rotating tool. Tool spindle 121 rotates the held rotating tool about a rotation axis 503 parallel to the X-axis-Z-axis plane during the milling of the workpiece using the rotating tool.

Tool spindle 121 is supported by ram 163. Tool spindle 121 is connected to a tip of ram 163 in the +Y-axis direction. Tool spindle 121 is three-dimensionally movable in processing area 110 by the movement of saddle 161 in the Z-axis direction, the movement of cross slide 162 in the X-axis direction, and the movement of ram 163 in the Y-axis direction.

Tool spindle 121 is further provided so as to be turnable about a turning axis 504 parallel to the Y-axis (B-axis turning). A turning range of tool spindle 121 is preferably within a range greater than or equal to ±90° with respect to a reference posture (posture in FIGS. 1 and 2) in which a spindle end face 122 of tool spindle 121 faces downward. As an example, the turning range of tool spindle 121 is a range of ±120° with respect to the reference posture.

Processing machine 100 further includes an automatic tool changer (ATC) 141 and a tool magazine 171.

Tool magazine 171 accommodates a plurality of rotating tools T used for milling the workpiece. Tool magazine 171 is provided outside processing area 110. Tool magazine 171 is provided on the opposite side of processing area 110 across first workpiece spindle 111 (first longitudinal frame 152). First workpiece spindle 111 (first longitudinal frame 152) is disposed between tool magazine 171 and processing area 110 in the Z-axis direction.

Automatic tool changer 141 is configured to be able to exchange tools between tool spindle 121 in processing area 110 and tool magazine 171 outside processing area 110.

Automatic tool changer 141 is supported by first transverse frame 154. Automatic tool changer 141 is movable in the Z-axis direction by various feed mechanisms, guide mechanisms, servomotors, and the like provided on first transverse frame 154 and the like.

More specifically, a rack 156 and a rail 155 are provided in first transverse frame 154. Rack 156 and rail 155 extend in the Z-axis direction. The range in which rack 156 and rail 155 extend in the Z-axis direction includes the range of processing area 110 in the Z-axis direction. A pinion (not illustrated) that engages with rack 156 is provided in automatic tool changer 141. A slider (not illustrated) slidable in the Z-axis direction while being engaged with rail 155 is provided in automatic tool changer 141.

When the pinion receiving the rotation from the servo motor rotates in the forward direction or the reverse direction, automatic tool changer 141 moves in the +Z-axis direction or the −Z-axis direction. Automatic tool changer 141 is movable between the inside and the outside of processing area 110.

Automatic tool changer 141 is movable between a standby position (position of automatic tool changer 141 in FIG. 1) that is located outside processing area 110 and above first workpiece spindle 111 and at which automatic tool changer 141 waits, an internal-side tool changing position that is located inside processing area 110 and at an arbitrary coordinate in the Z-axis direction and at which automatic tool changer 141 performs tool change with tool spindle 121, and a magazine-side tool changing position that is located outside processing area 110 and on an opposite side of the internal-side tool changing position with the standby position interposed therebetween and at which automatic tool changer 141 performs tool replacement with tool magazine 171.

Automatic tool changer 141 includes a lifting arm 143 and a double arm 144. Lifting arm 143 extends in an arm shape such that the X-axis direction (vertical direction) is the longer direction. Lifting arm 143 can lift and lower in the X-axis direction.

Double arm 144 extends in an arm shape, and includes gripping portions capable of gripping tools at both ends thereof. The double arm 144 is turnable about a turning axis 505 parallel to the Z-axis and is slidable in the axial direction of turning axis 505. Automatic tool changer 141 performs tool replacement by lifting and lowering lifting arm 143 and turning and sliding double arm 144 at each of the internal-side tool changing position and the magazine-side tool changing position.

Processing machine 100 further includes additive-manufacturing head 131. Additive-manufacturing head 131 performs additive manufacturing (directed energy deposition) by ejecting the material powder and irradiating the workpiece with laser beam. Metal powder such as stainless steel, Stellite, Inconel, or titanium can be used as the material powder. The material powder is not limited to the metal powder.

Additive-manufacturing head 131 includes a head body 132 and a laser tool 133. The laser beam and the material powder are introduced into head body 132. Laser tool 133 emits the laser beam toward the workpiece and determines an irradiation region of the laser beam on the workpiece. The material powder introduced into additive-manufacturing head 131 is discharged toward the workpiece through a nozzle (not illustrated).

Processing machine 100 includes a plurality of laser tools 133. The plurality of laser tools 133 are different in the shape and/or a size of the irradiation region of the laser beam defined on the workpiece. Any one of the plurality of laser tools 133 is selectively mounted on head body 132 in accordance with a condition of the additive manufacturing to be executed.

Additive-manufacturing head 131 further includes a disk portion 136. Disk portion 136 has a disk shape in which a thickness direction is the Y-axis direction. Disk portion 136 is connected to head body 132. Disk portion 136 is provided at a position bent at a right angle from the front end portion of head body 132 in the +Y-axis direction. Tool spindle 121 includes a front surface portion 124 and a side surface portion 123. Front surface portion 124 faces the +Y-axis direction. Side surface portion 123 faces the +Z-axis direction in the reference posture of tool spindle 121.

Additive-manufacturing head 131 is detachably attached to tool spindle 121. Additive-manufacturing head 131 is mounted on tool spindle 121 such that head body 132 is opposite to side surface portion 123 and such that disk portion 136 is opposite to front surface portion 124.

Additive-manufacturing head 131 (disk portion 136) and tool spindle 121 (front surface portion 124) have a built-in clamp mechanism using spring force or the like. When additive-manufacturing head 131 is mounted on tool spindle 121, the clamp mechanism operates to couple additive-manufacturing head 131 to tool spindle 121. Additive-manufacturing head 131 is coupled to tool spindle 121 to be integrally movable with tool spindle 121 in the X-axis direction, the Y-axis direction, and the Z-axis direction. The structure of the clamp mechanism that couples tool spindle 121 and additive-manufacturing head 131 will be described later in detail.

Figure 3:
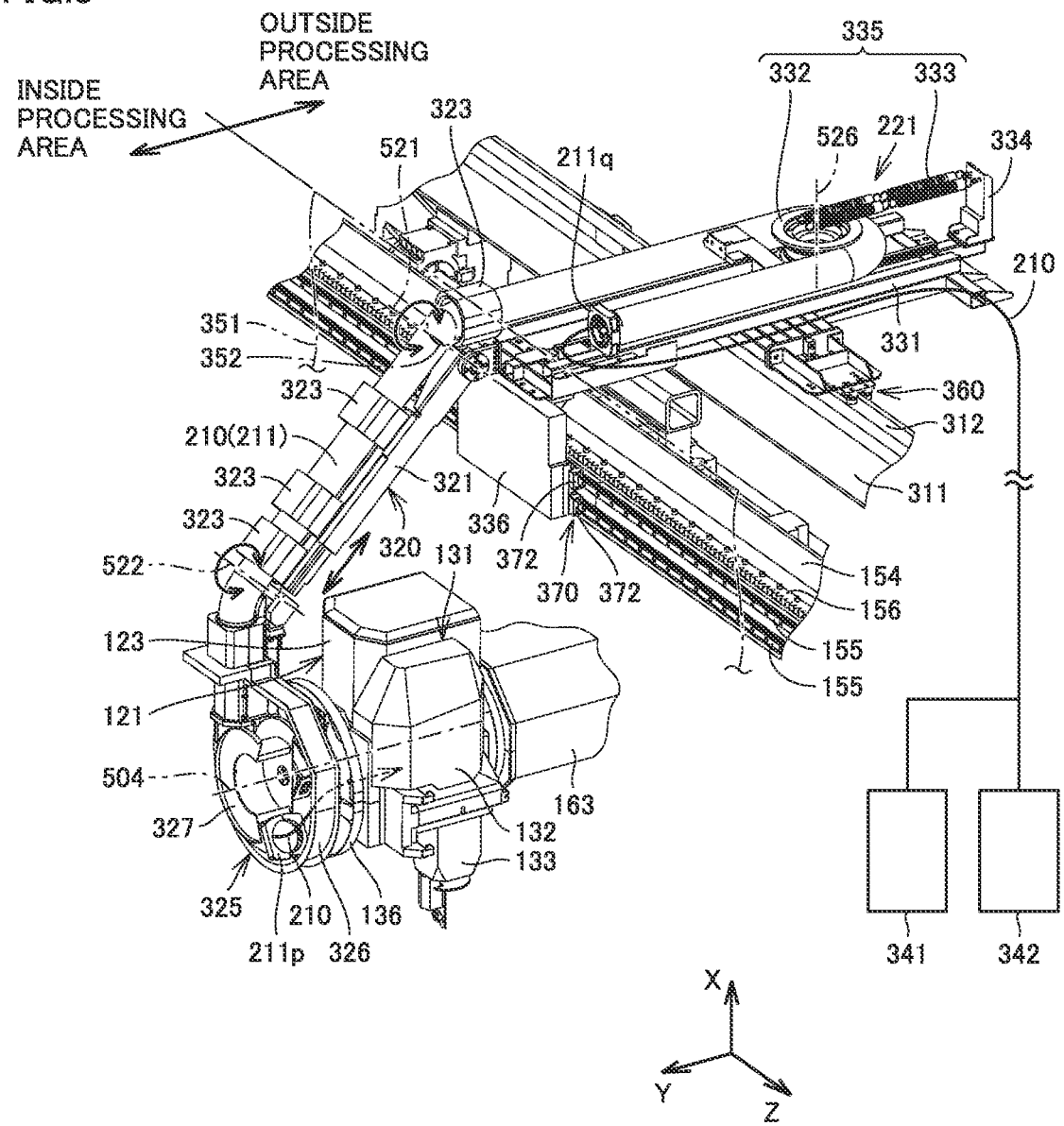
FIG. 3 is a perspective view illustrating a structure supplying a laser beam and a material powder to the additive-manufacturing head in FIG. 1.
Figure 4:
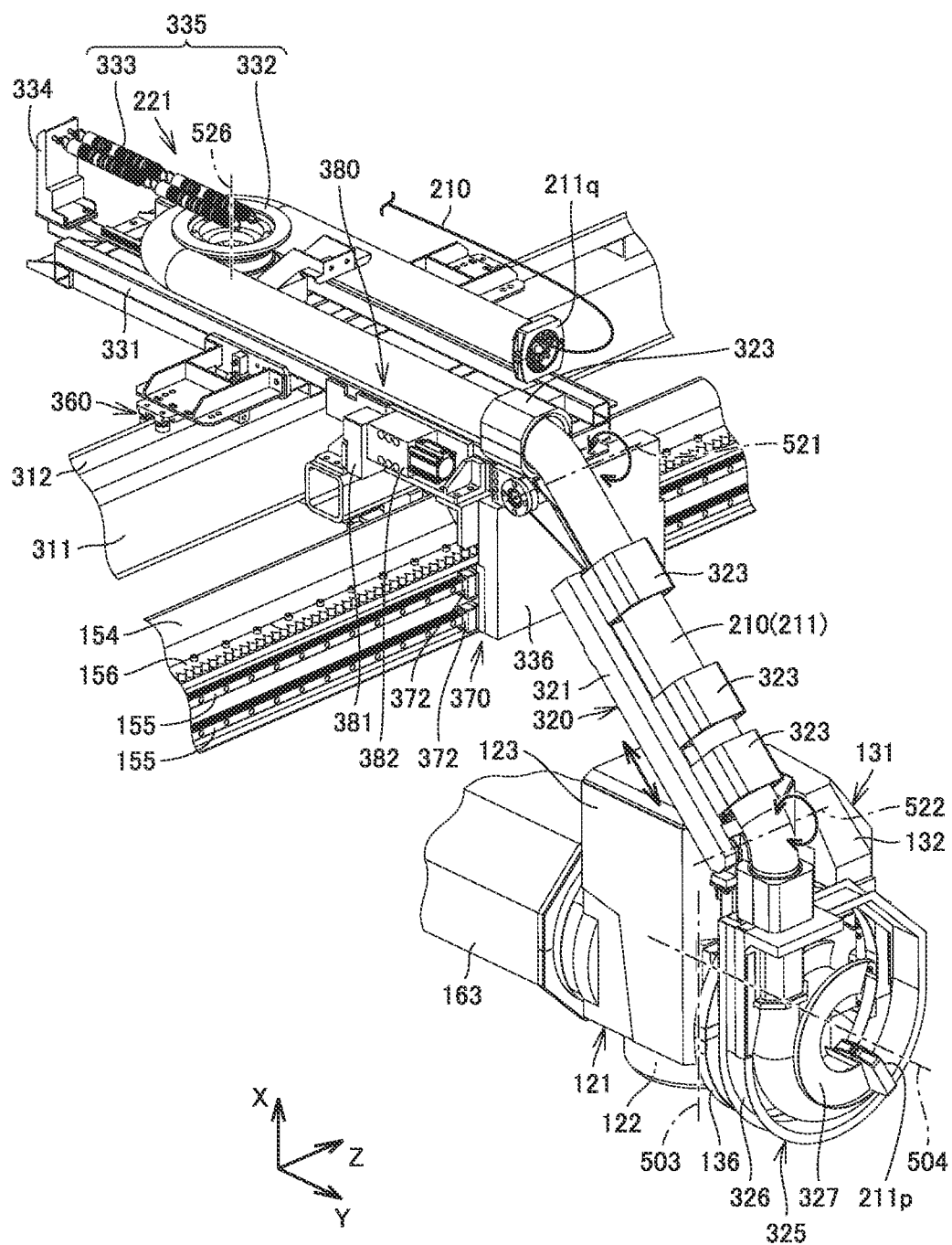
FIG. 4 is another perspective view illustrating the structure supplying the laser beam and the material powder to the additive-manufacturing head in FIG. 1.

FIGS. 3 and 4 are perspective views illustrating a structure supplying the laser beam and the material powder to the additive-manufacturing head in FIG. 1.

Referring to FIGS. 1 to 4, processing machine 100 further includes a material powder supply device 341, a laser oscillation device 342, and a line body 210.

Material powder supply device 341 and laser oscillation device 342 are installed outside processing area 110. Material powder supply device 341 feeds the material powder used for the additive manufacturing toward additive-manufacturing head 131. Laser oscillation device 342 oscillates the laser beam used for the additive manufacturing.

Line body 210 supplies the material powder from material powder supply device 341 to additive-manufacturing head 131, and supplies the laser beam from laser oscillation device 342 to additive-manufacturing head 131. Line body 210 extends from additive-manufacturing head 131. Line body 210 is drawn from the inside to the outside of processing area 110, and connected to material powder supply device 341 and laser oscillation device 342.

Line body 210 has flexibility, and can be bent and deformed when receiving external force. Line body 210 includes an optical fiber guiding the laser beam, a pipe guiding the material powder, an air pipe serving as a flow path of air, a gas pipe serving as a flow path of an inert gas, a cooling pipe serving as a flow path of a refrigerant, electric wiring, and a flexible tube 211 accommodating these.

Referring to FIGS. 3 and 4, splash guard 181 includes a slide cover 351.

As a whole, slide cover 351 has a flat plate shape parallel to the X-axis-Z-axis plane. Slide cover 351 is disposed on the back side of processing area 110 (the end of processing area 110 in the −Y-axis direction). Ram 163 penetrates slide cover 351 from the outside of processing area 110 and enters processing area 110 in the Y-axis direction. Slide cover 351 is slidably deformable in accordance with the movement of ram 163 in the X-axis direction and the Z-axis direction.

A line body insertion hole 352 is made in slide cover 351. Line body insertion hole 352 is a through-hole penetrating slide cover 351 in the Y-axis direction. Line body 210 (flexible tube 211) is inserted into line body insertion hole 352 from the inside of processing area 110 to be drawn out of processing area 110.

processing machine 100 further includes a line body support 221. Line body support 221 is provided outside processing area 110. Line body support 221 supports line body 210 drawn from processing area 110 outside processing area 110. Line body support 221 is provided above additive-manufacturing head 131. Line body support 221 is supported by first transverse frame 154 and second transverse frame 311.

Line body support 221 includes a base 331, a pulley portion 332, and a coil spring (elastic member) 333.

Base 331 is provided on first transverse frame 154 and second transverse frame 311. Base 331 is provided across first transverse frame 154 and second transverse frame 311 in top view. Line body 210 drawn from the inside to the outside of processing area 110 is routed on base 331. Line body 210 routed on base 331 is inserted into cable bear (registered trademark) (not illustrated) that can stroke in the Z-axis direction, and then extends toward material powder supply device 341 and laser oscillation device 342.

Pulley portion 332 is supported by base 331. Pulley portion 332 is provided so as to be rotatable about a rotation axis 526 parallel to the X-axis direction (vertical direction) and to be slidable in the Y-axis direction.

One end of coil spring 333 is connected to pulley portion 332. The other end of coil spring 333 is connected to base 331 with a bracket 334 interposed therebetween. Coil spring 333 applies elastic force in the −Y-axis direction to pulley portion 332. Coil spring 333 applies the elastic force in the direction away from processing area 110 in top view to pulley portion 332.

Flexible tube 211 is made of a flexible tube. Flexible tube 211 extends between the inside and the outside of processing area 110. One end 211p of flexible tube 211 is disposed inside processing area 110. The other end 211q of flexible tube 211 is disposed outside processing area 110.

Flexible tube 211 drawn from the inside to the outside of processing area 110 extends in the −Y-axis direction on base 331. Flexible tube 211 is wound around pulley portion 332, is inverted by 180°, and extends in the +Y-axis direction. The other end 211q of flexible tube 211 is fixed to base 331 at the tip of flexible tube 211 extending in the +Y-axis direction.

Pulley portion 332 and coil spring 333 constitute a tension applying mechanism 335. Tension applying mechanism 335 applies tension in the direction away from additive-manufacturing head 131 in processing area 110 to line body 210 (flexible tube 211). Tension applying mechanism 335 applies tensile force from the inside to the outside of processing area 110 to line body 210 (flexible tube 211).

According to such the configuration, deflection of line body 210 in processing area 110 can be prevented. When pulley portion 332 slides in the Y-axis direction, the length of line body 210 in processing area 111 can be automatically adjusted in accordance with the position of additive-manufacturing head 131.

The elastic member constituting tension applying mechanism 335 is not particularly limited, and for example, a gas spring may be used instead of coil spring 333.

Processing machine 100 further includes a first guide mechanism 370 and a second guide mechanism 360. First guide mechanism 370 and second guide mechanism 360 guide line body support 221 along the Z-axis direction. First guide mechanism 370 and second guide mechanism 360 are provided apart from each other in the Y-axis direction.

Line body support 221 further includes a block 336. Block 336 is fixed to base 331. Block 336 is opposite to first transverse frame 154 in the Y-axis direction.

First guide mechanism 370 includes rail 155 and a slider 372. First guide mechanism 370 includes two sets of rails 155 and sliders 372. Rail 155 is attached to first transverse frame 154. Rail 155 extends in the Z-axis direction. Slider 372 is attached to block 336. Slider 372 is engaged with rail 155 with a plurality of balls (not illustrated) interposed therebetween. Slider 372 and rail 155 constitute a linear guide mechanism in the Z-axis direction.

Second guide mechanism 360 is provided at a position away from first guide mechanism 370 in the −Y-axis direction. Second guide mechanism 360 includes a rail 312. Rail 312 is attached to second transverse frame 311. Rail 312 extends in the Z-axis direction. A pair of first rollers sandwiching rail 312 from both sides in the Y-axis direction and rotatable about a rotation axis parallel to the X-axis direction and a pair of second rollers sandwiching the rail 312 from both sides in the X-axis direction and rotatable about a rotation axis parallel to the Y-axis direction are attached to line body support 221 (base 331).

Processing machine 100 further includes a first guide member 320. First guide member 320 guides line body 210 (flexible tube 211) between additive-manufacturing head 131 and line body support 221. First guide member 320 is connected to additive-manufacturing head 131 so as to be able to revolve about a first revolving axis 522 parallel to the Z-axis. First guide member 320 is connected to line body support 221 so as to be able to revolve about a second revolving axis 521 parallel to the Z-axis.

First guide member 320 extends obliquely downward (+Y-axis direction and −X-axis direction) from line body support 221 toward a second guide member 325 described later. First guide member 320 is connected to second guide member 325 in first revolving axis 522, and connected to base 331 in the second revolving axis 521. When first guide member 320 revolves about first revolving axis 522 and second revolving axis 521, an inclination of first guide member 320 changes.

The first guide member 320 includes a linear guide portion 321 and a plurality of cover bodies 323.

Linear guide portion 321 extends linearly between first revolving axis 522 and second revolving axis 521. Linear guide portion 321 is provided so as to support line body 210 (flexible tube 211) fed from line body support 221 toward second guide member 325 from below. Linear guide portion 321 is provided as an expansion and contraction mechanism that expands and contracts such that the distance between first revolving axis 522 and second revolving axis 521 changes. Linear guide portion 321 has a multistage structure of a plurality of linear guides combined so as to be extendable in a direction from first revolving axis 522 toward second revolving axis 521.

The plurality of cover bodies 323 are attached to linear guide portion 321. The plurality of cover bodies 323 are arranged at intervals in the direction from first revolving axis 522 toward second revolving axis 521. Cover body 323 is provided so as to cover flexible tube 211 supported by linear guide portion 321 from the outer periphery thereof. Flexible tube 211 is supported by first guide member 320 so as to be slidable along a guiding direction (a direction connecting first revolving axis 522 and second revolving axis 521) by first guide member 320.

According to such the configuration, when additive-manufacturing head 131 moves in the Y-axis-X-axis plane, first guide member 320 revolves about first revolving axis 522 and second revolving axis 521, and linear guide portion 321 extends and contracts. Thus, a routing path of line body 210 (flexible tube 211) between second guide member 325 and line body support 221 smoothly changes in accordance with the movement of additive-manufacturing head 131, so that line body 210 (flexible tube 211) can be smoothly drawn without applying an excessive load.

Processing machine 100 further includes second guide member 325. Second guide member 325 is provided between additive-manufacturing head 131 and first guide member 320 on the path on which line body 210 is routed. Second guide member 325 guides line body 210 extending from additive-manufacturing head 131 along the circumferential direction of turning axis 504.

Second guide member 325 revolves relative to tool spindle 121 about turning axis 504 so as to maintain the posture of second guide member 325 in the circumferential direction of turning axis 504 when tool spindle 121 turns.

Disk portion 136 is disposed between second guide member 325 and tool spindle 121 in the Y-axis direction (the axial direction of turning axis 504). Second guide member 325 is supported by disk portion 136 in additive-manufacturing head 131. Second guide member 325 is relatively revolvable about turning axis 504 with respect to disk portion 136.

Second guide member 325 has an outer peripheral wall 326. Outer peripheral wall 326 forms a wall shape extending along the circumferential direction of turning axis 504.

An inner peripheral wall 327 is connected to disk portion 136. Inner peripheral wall 327 forms a wall shape protruding in the +Y-axis direction from disk portion 136 and extending along the circumferential direction of turning axis 504. Inner peripheral wall 327 is disposed on the inner peripheral side of outer peripheral wall 326. A space extending in the circumferential direction of turning axis 504 is provided between inner peripheral wall 327 and outer peripheral wall 326, and line body 210 (flexible tube 211) is disposed in the space.

When tool spindle 121 turns, inner peripheral wall 327 turns about turning axis 504 together with disk portion 136 integrated with tool spindle 121. On the other hand, because first guide member 320 is connected to second guide member 325, second guide member 325 revolves relative to tool spindle 121 (disk portion 136) about turning axis 504 so as to maintain the posture of second guide member 325 in the circumferential direction of turning axis 504.

At this point, line body 210 (flexible tube 211) slides in the circumferential direction of turning axis 504 in the space between inner peripheral wall 327 and outer peripheral wall 326, whereby the relative positional relationship between one end 211p of flexible tube 211 and head body 132 is maintained. Thus, the routing path of line body 210 around turning axis 504 is maintained, so that the application of the excessive load to line body 210 accompanying the B-axis turning of tool spindle 121 can be prevented.

Referring to FIG. 4, processing machine 100 further includes a coupling mechanism 380. Coupling mechanism 380 includes an air cylinder 382 and a block 381.

Block 381 is attached to saddle 161. A pin insertion hole (not illustrated) is made in block 381. Air cylinder 382 is attached to line body support 221. Air cylinder 382 includes a pin (not illustrated) movable forward and backward in the Y-axis direction. A state in which tool spindle 121 and line body support 221 are coupled to each other is obtained when the pins of air cylinder 382 is inserted into the pin insertion holes made in block 381, and a state in which the coupling between tool spindle 121 and line body support 221 is released is obtained when the pins of air cylinder 382 is removed from the pin insertion holes made in block 381.

During the additive manufacturing for the workpiece, tool spindle 121 and line body support 221 are coupled by coupling mechanism 380, so that line body support 221 can be moved in the Z-axis direction integrally with tool spindle 121 and additive-manufacturing head 131. During the subtractive manufacturing for the workpiece, when the coupling between tool spindle 121 and line body support 221 by coupling mechanism 380 is released, line body support 221 and additive-manufacturing head 131 can be separated from tool spindle 121, and tool spindle 121 can be moved alone.

Line body support 221 is further configured to be movable in the Z-axis direction in a single state separated from tool spindle 121 (self-traveling mechanism).

More specifically, a rack 156 is provided in first transverse frame 154. Rack 156 extends in the Z-axis direction. A servomotor 222 (not illustrated in FIGS. 3 and 4, see FIG. 1) and a pinion (not illustrated) connected to an output axis of servomotor 222 and engaged with rack 156 are provided in line body support 221. While the coupling between tool spindle 121 and line body support 221 by coupling mechanism 380 is released, the pinion receiving the rotation from servomotor 222 rotates in a forward direction or a reverse direction, so that line body support 221 moves in the +Z-axis direction or the −Z-axis direction.

Figure 5:
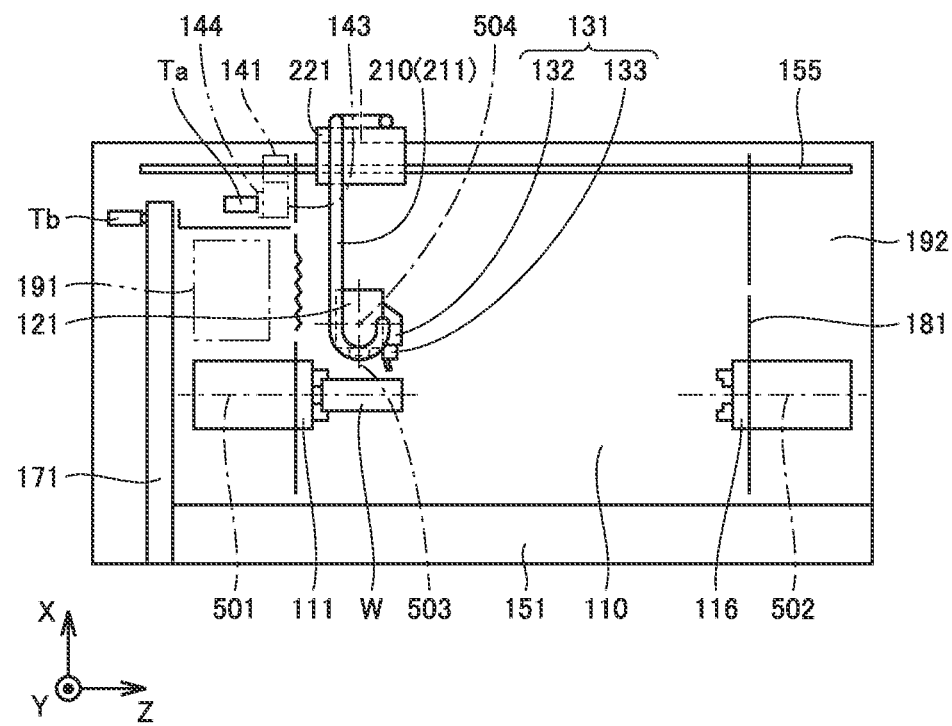
FIG. 5 is a front view schematically illustrating a first step of a processing flow of a workpiece in the processing machine in FIG. 1.
Figure 6:
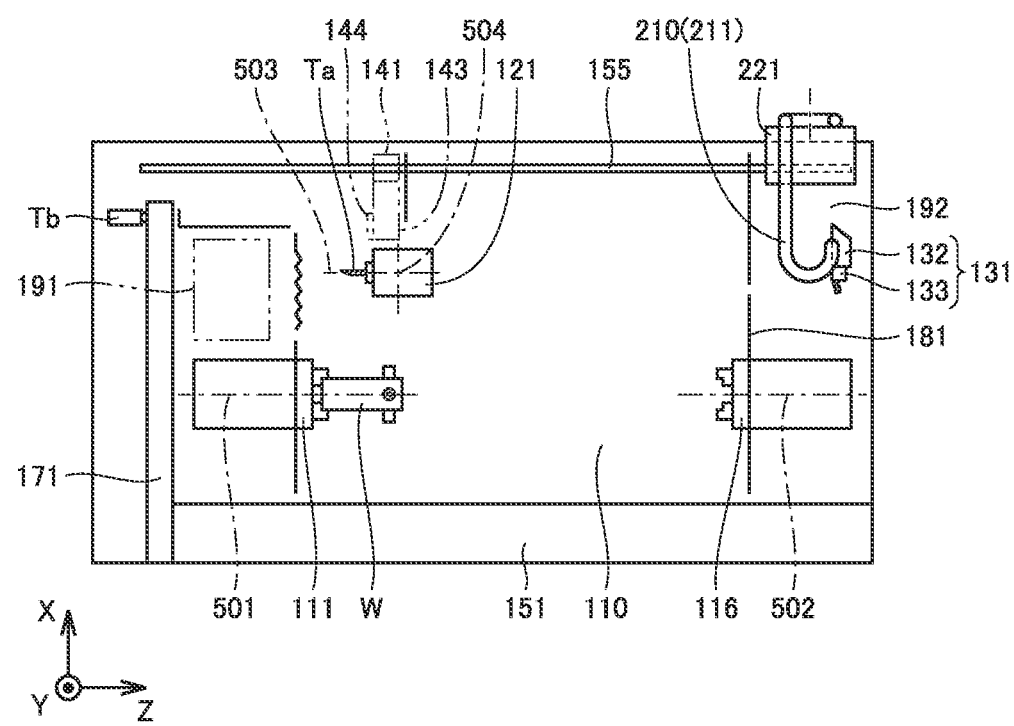
FIG. 6 is a front view schematically illustrating a second step of the processing flow of the workpiece in the processing machine in FIG. 1.
Figure 7:
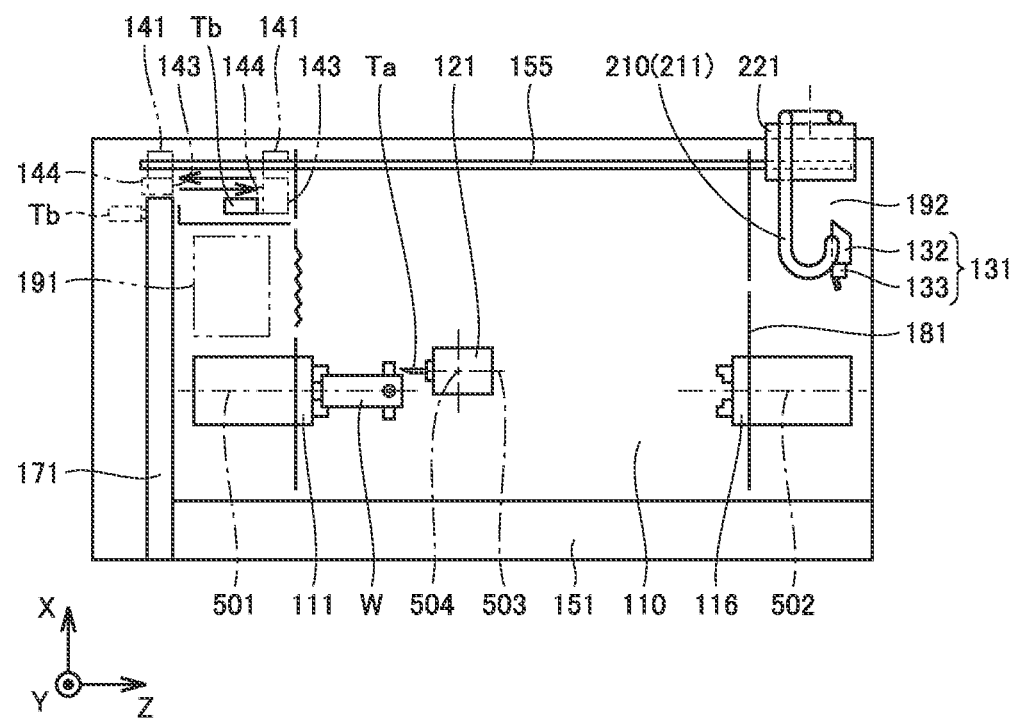
FIG. 7 is a front view schematically illustrating a third step of the processing flow of the workpiece in the processing machine in FIG. 1.

FIGS. 5 to 7 are front views schematically illustrating a processing flow of the workpiece in the processing machine in FIG. 1.

Referring to FIGS. 5 to 7, processing machine 100 further includes a laser tool storage portion 191 and a head storage portion 192. Laser tool storage portion 191 is configured to be able to store a plurality of laser tools 133. Head storage portion 192 is configured to be able to store additive-manufacturing head 131 separated from tool spindle 121 during subtractive manufacturing for the workpiece.

Laser tool storage portion 191 and head storage portion 192 are provided outside processing area 110. Laser tool storage portion 191 is provided between first workpiece spindle 111 and the standby position of automatic tool changer 141 in the X-axis direction (vertical direction). Head storage portion 192 is provided above second workpiece spindle 116.

As illustrated in FIG. 5, during the additive manufacturing for a workpiece W, additive-manufacturing head 131 is coupled to tool spindle 121. When tool spindle 121 moves in the X-axis direction, the Y-axis direction, and the Z-axis direction, additive-manufacturing head 131 also moves in processing area 110 integrally with tool spindle 121. Thus, the processing position of the additive manufacturing by additive-manufacturing head 131 is three-dimensionally displaced. Furthermore, when tool spindle 121 turns about turning axis 504, additive-manufacturing head 131 also turns about turning axis 504 integrally with tool spindle 121. Thus, the direction of the additive manufacturing by additive-manufacturing head 131 (the irradiation direction of the laser beam with respect to the workpiece) can be freely changed.

When additive-manufacturing head 131 is moved to the position opposite to laser tool storage portion 191 in the Z-axis direction, laser tool 133 mounted on additive-manufacturing head 131 can be replaced with another laser tool 133 stored in the laser tool storage portion 191.

As illustrated in FIG. 6, when the subtractive manufacturing for workpiece W is performed subsequent to the additive manufacturing for workpiece W, the coupling between tool spindle 121 and additive-manufacturing head 131 is released, and the coupling between line body support 221 and saddle 161 is also released. Additive-manufacturing head 131 integrated with line body support 221 is moved from the inside of processing area 110 to head storage portion 192 outside processing area 110 by the self-traveling mechanism provided in line body support 221.

On the other hand, tool spindle 121 from which additive-manufacturing head 131 is separated is turned by 90° about turning axis 504 from the reference posture. Automatic tool changer 141 is moved from the standby position to the internal-side tool changing position in processing area 110. A tool Ta gripped by automatic tool changer 141 is mounted on tool spindle 121 by automatic tool changer 141. When automatic tool changer 141 is moved from the internal-side tool changing position to the standby position, the mounting of the tool to tool spindle 121 is completed.

The internal-side tool changing position is appropriately set such that a movement amount of tool spindle 121 from the position of tool spindle 121 to the internal-side tool changing position at the start of tool change is shortened. The internal-side tool changing position set in this way may be selected from any coordinate in the Z-axis direction, or selected from a plurality of coordinate candidates in the Z-axis direction.

As illustrated in FIG. 7, during the subtractive manufacturing for workpiece W, the workpiece is milled by tool Ta held by tool spindle 121 while additive-manufacturing head 131 is stored in head storage portion 192.

During this time, automatic tool changer 141 is moved from the standby position to the magazine-side tool changing position, and tool Tb stored in tool magazine 171 at the magazine-side tool changing position is moved to automatic tool changer 141. Automatic tool changer 141 holding tool Tb is moved from the magazine-side tool changing position to the standby position to prepare for the next tool change in tool spindle 121.

A clamp device of the embodiment will be described in detail below. The clamp device of the embodiment is applied to the coupling of tool spindle 121 and additive-manufacturing head 131.

Figure 8:
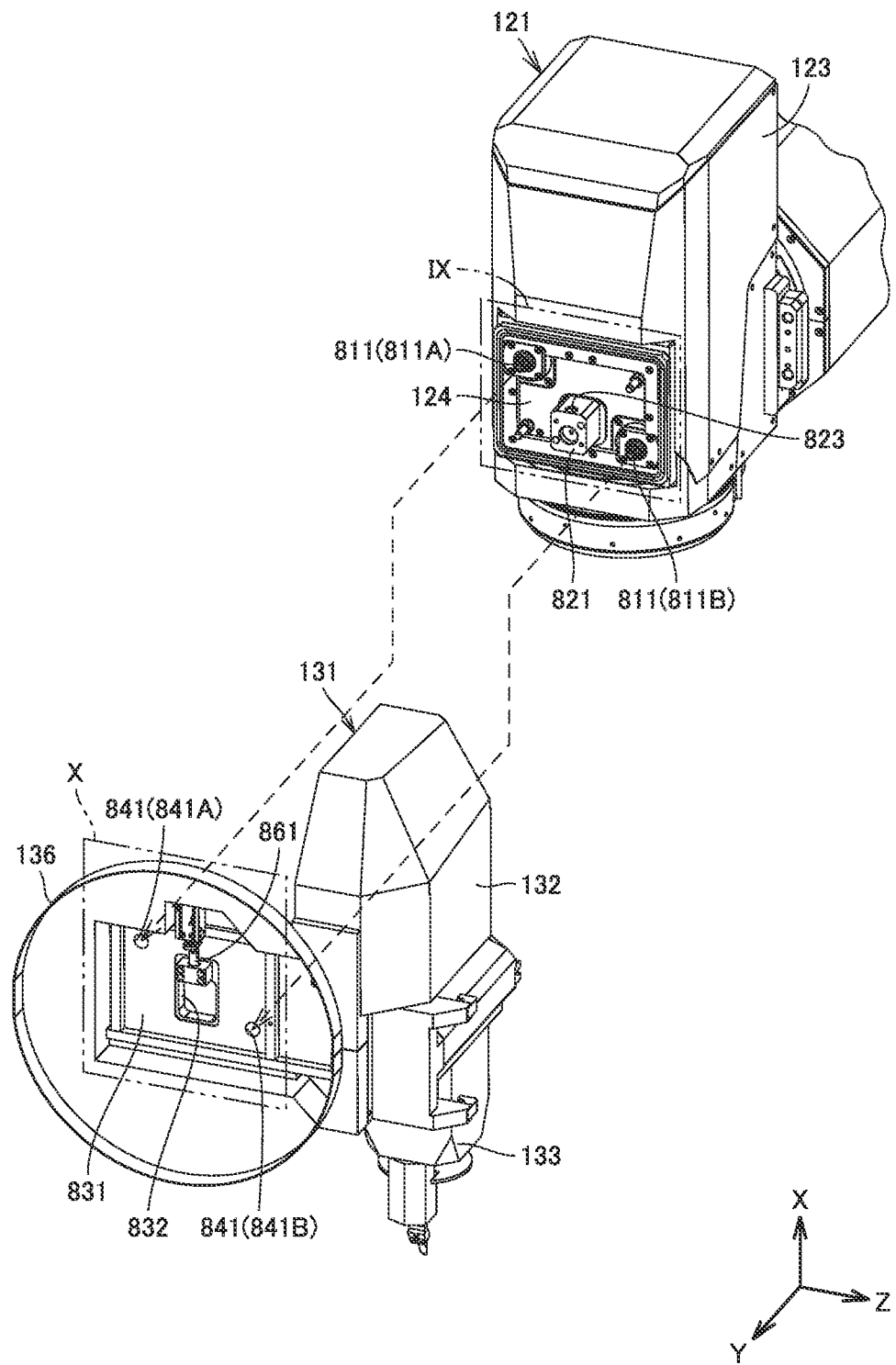
FIG. 8 is a perspective view illustrating a tool spindle and an additive-manufacturing head in a non-coupling state.
Figure 9:
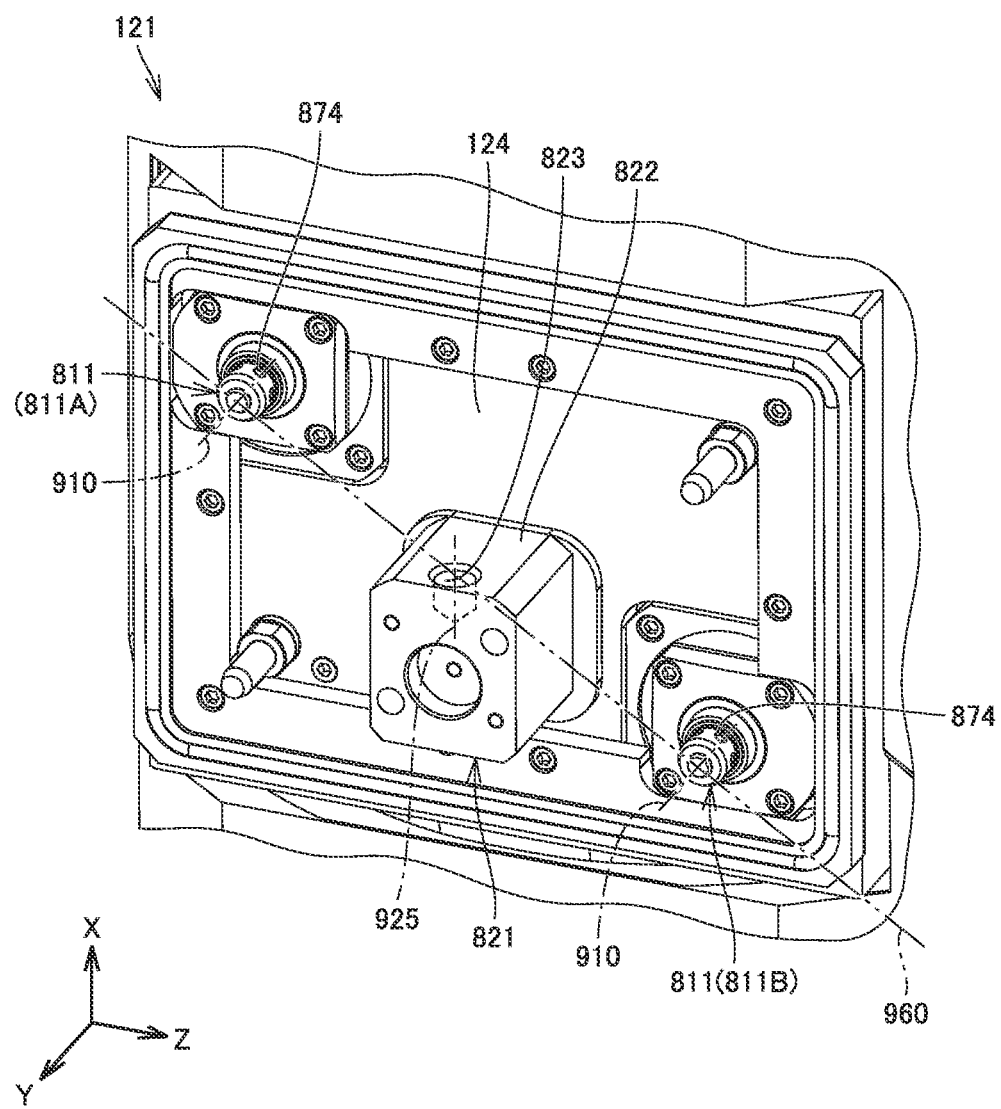
FIG. 9 is a perspective view illustrating the tool spindle in a range surrounded by a two-dot chain line IX in FIG. 8.
Figure 10:
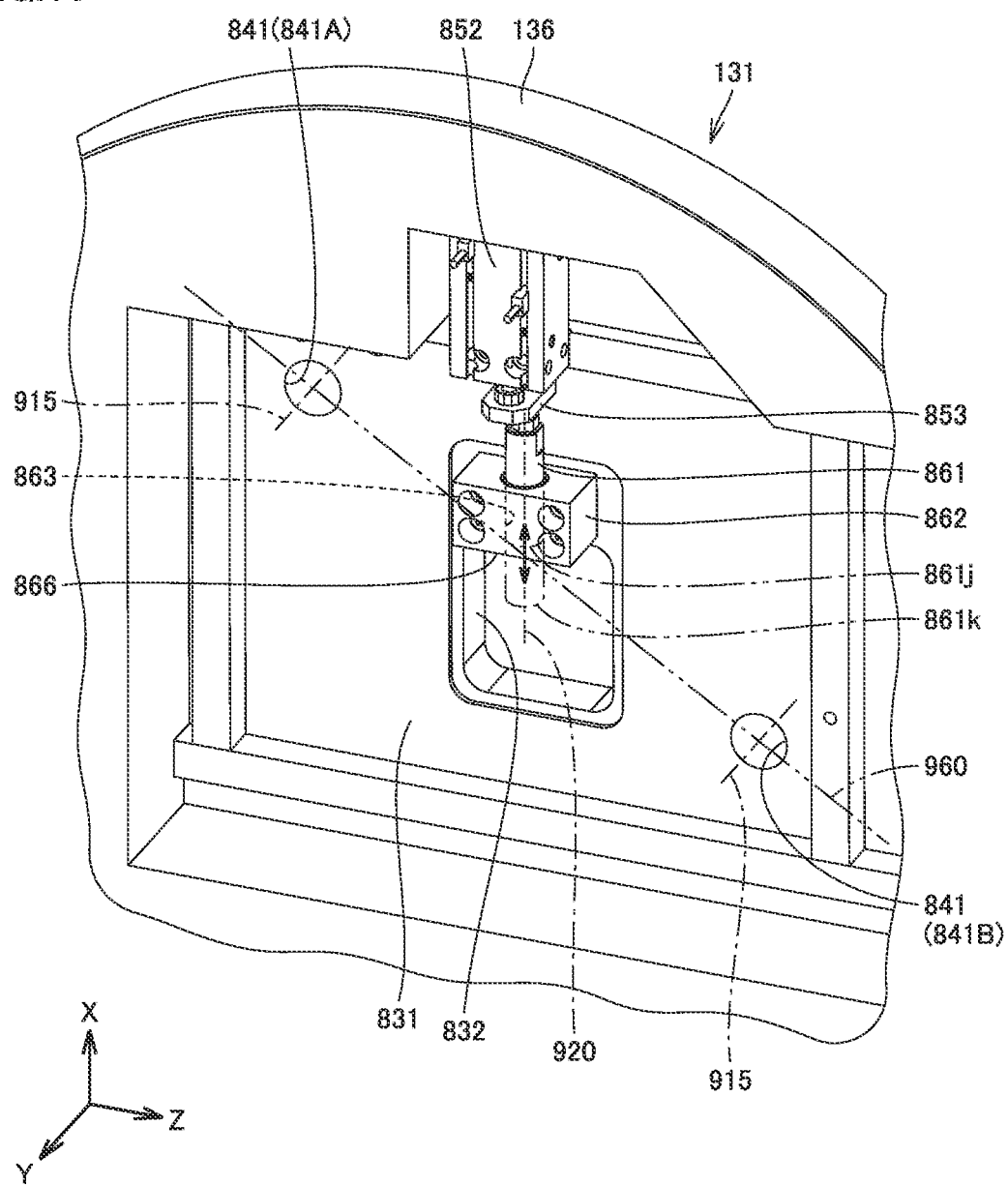
FIG. 10 is a perspective view illustrating the additive-manufacturing head in a range surrounded by a two-dot chain line X in FIG. 8.

FIG. 8 is a perspective view illustrating the tool spindle and the additive-manufacturing head in a non-coupling state. In FIG. 8, illustration of first guide member 320 and second guide member 325 is omitted from additive-manufacturing head 131 in FIG. 2. FIG. 9 is a perspective view illustrating the tool spindle in a range surrounded by a two-dot chain line IX in FIG. 8. FIG. 10 is a perspective view illustrating the additive-manufacturing head in a range surrounded by a two-dot chain line X in FIG. 8.

Figure 11:
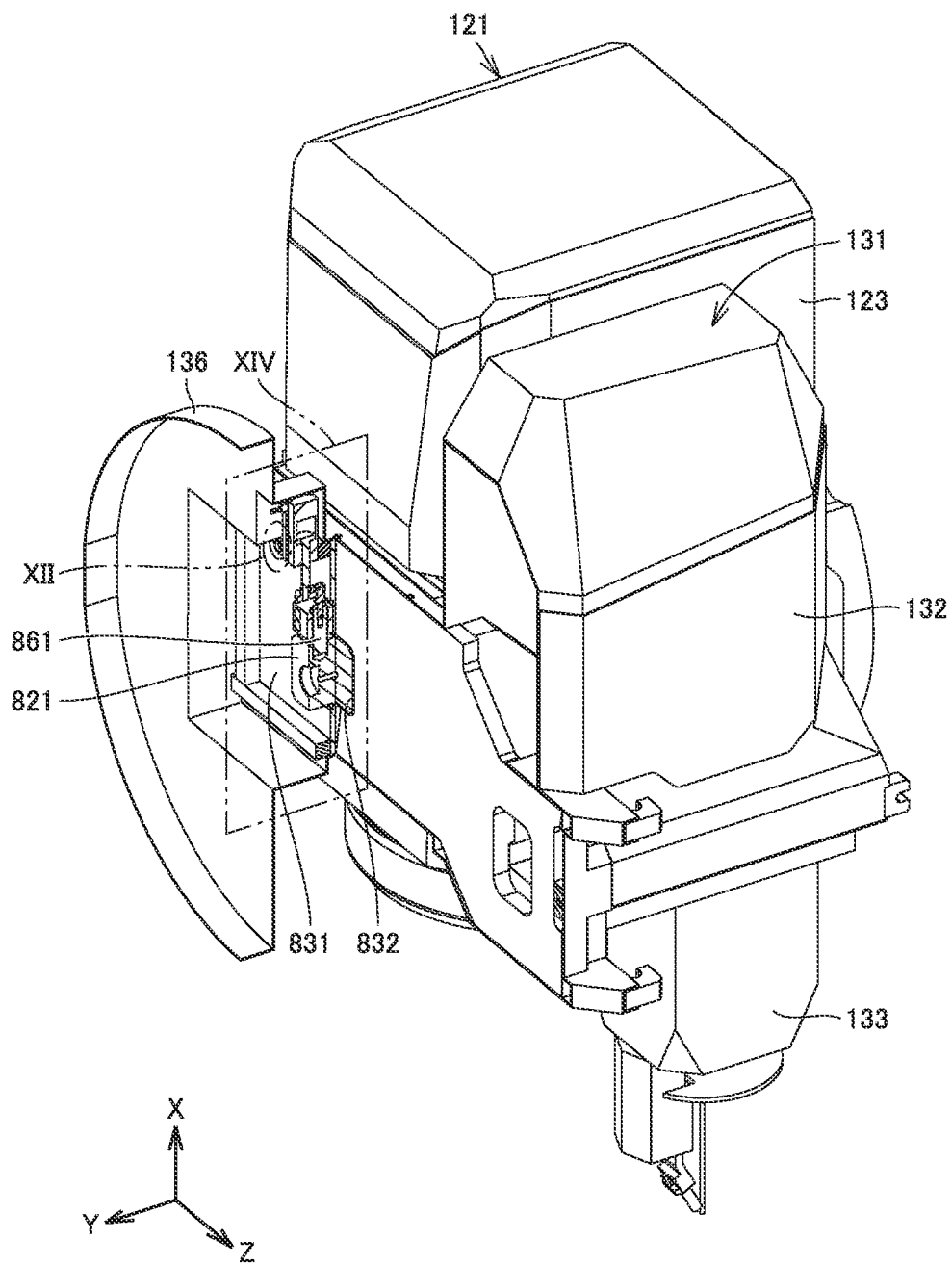
FIG. 11 is a perspective view illustrating the tool spindle and the additive-manufacturing head in a coupling state.
Figure 12:
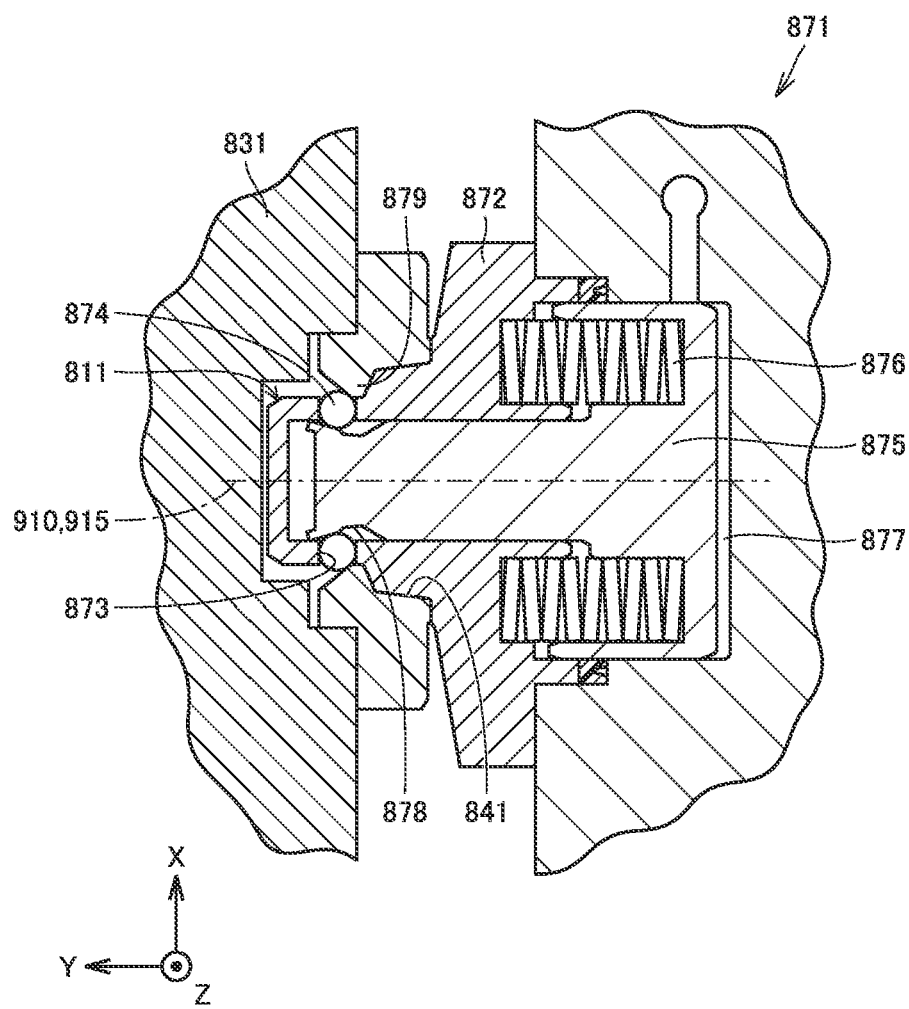
FIG. 12 is a sectional view illustrating the tool spindle and the additive-manufacturing head in a range surrounded by a two-dot chain line XII in FIG. 11.
Figure 13:
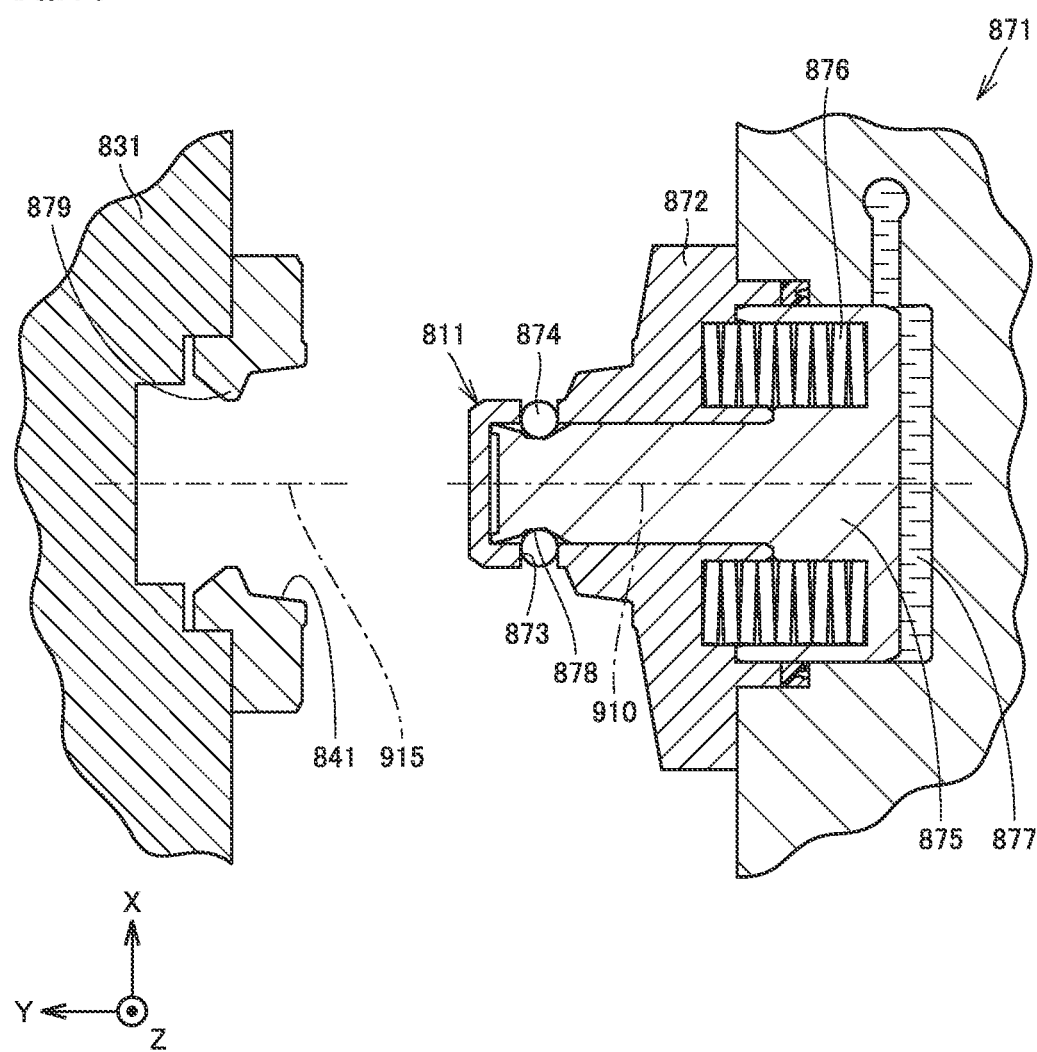
FIG. 13 is a sectional view illustrating a state in which the tool spindle and the additive-manufacturing head in FIG. 12 are separated.
Figure 14:
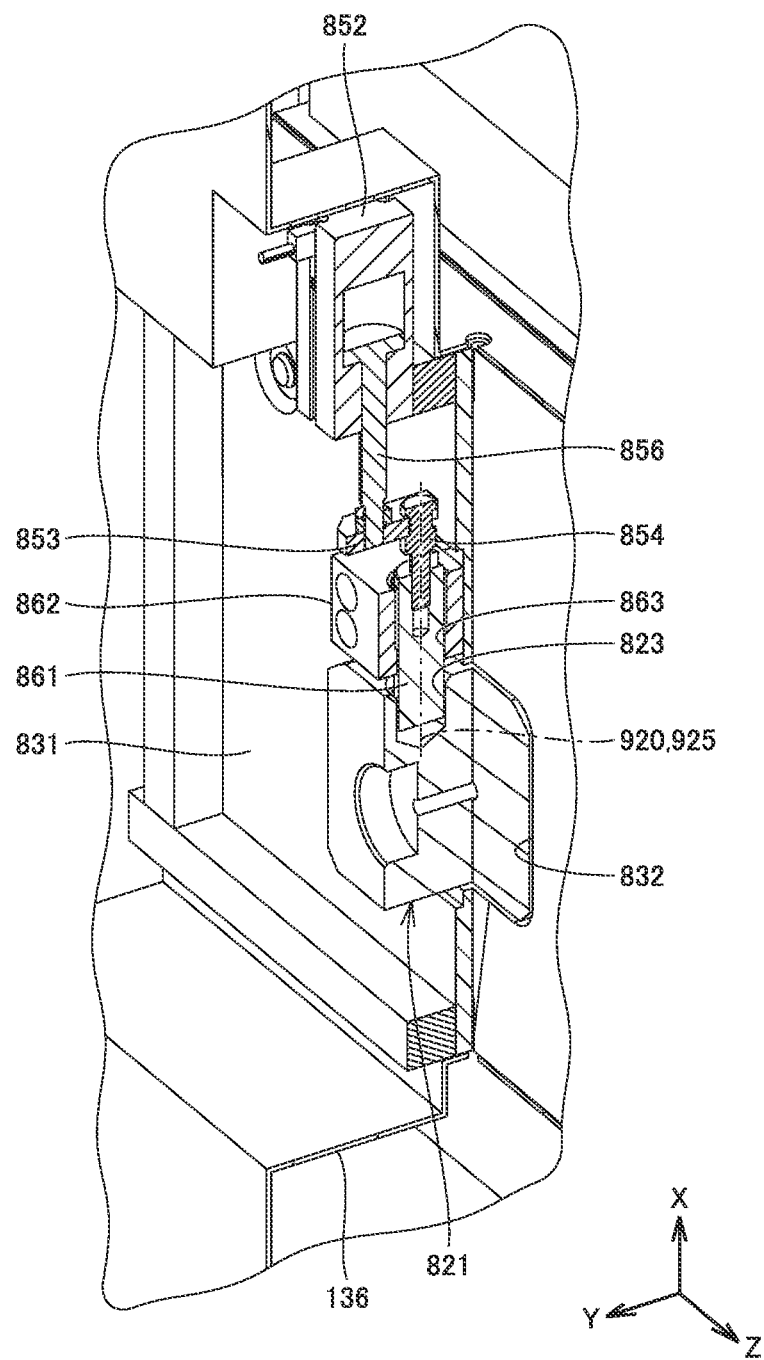
FIG. 14 is a perspective view illustrating the tool spindle and the additive-manufacturing head in a range surrounded by a two-dot chain line XIV in FIG. 11.

FIG. 11 is a perspective view illustrating the tool spindle and the additive-manufacturing head in a coupling state. FIG. 11 illustrates a section obtained by cutting a part of tool spindle 121 and additive-manufacturing head 131 along the X-Y plane. FIG. 12 is a sectional view illustrating the tool spindle and the additive-manufacturing head (clamp mechanism portion) in a range surrounded by a two-dot chain line XII in FIG. 11. FIG. 13 is a sectional view illustrating a state in which the tool spindle and the additive-manufacturing head in FIG. 12 are separated. FIG. 14 is a perspective view illustrating the tool spindle and the additive-manufacturing head in a range surrounded by a two-dot chain line XIV in FIG. 11.

Referring to FIGS. 8 to 14, the clamp device of the embodiment includes tool spindle 121, additive-manufacturing head 131, and a clamp mechanism portion 871 (see FIGS. 12 and 13).

As illustrated in FIGS. 8 and 9, tool spindle 121 includes a protrusion 811. Protrusion 811 is provided on front surface portion 124. Protrusion 811 has a protruding shape protruding in the +Y-axis direction on front surface portion 124. Protrusion 811 has the protruding shape protruding in the axial direction of turning axis 504 (see FIGS. 3 and 4) of tool spindle 121.

Protrusion 811 has a columnar shape centered on a center axis 910 parallel to the Y-axis as a whole. A plurality of balls 874 are provided in protrusion 811. Balls 874 are arranged at intervals in the circumferential direction of center axis 910. Ball 874 is provided so as to be movable forward and backward in the radial direction of center axis 910.

Tool spindle 121 has a plurality of protrusions 811 (811A, 811B). Protrusion 811A and protrusion 811B are provided apart from each other on the X-axis-Z-axis plane.

As illustrated in FIGS. 8 and 10, additive-manufacturing head 131 (disk portion 136) includes an opposite plate 831. Opposite plate 831 has a plate shape parallel to the X-axis-Z-axis planes. Opposite plate 831 is disposed opposite to front surface portion 124 of tool spindle 121 while additive-manufacturing head 131 is connected to tool spindle 121.

A recess 841 is provided in additive-manufacturing head 131 (disk portion 136). Recess 841 is recessed from the surface of opposite plate 831 on the side opposed to front surface portion 124. Recess 841 is a through-hole penetrating opposite plate 831 in the Y-axis direction. Recess 841 may be configured by a bottomed hole. Recess 841 has a recessed shape capable of receiving protrusion 811. Recess 841 forms a columnar opening centered on center axis 915 parallel to the Y-axis direction as a whole.

A plurality of recesses 841 (841A, 841B) are provided in additive-manufacturing head 131. Recess 841A and recess 841B are provided apart from each other on the X-axis-Z-axis plane. A pitch between recess 841A and recess 841B is equal to a pitch between protrusion 811A and protrusion 811B.

As illustrated in FIGS. 8 and 12, protrusion 811 is inserted into recess 841 while additive-manufacturing head 131 is coupled to tool spindle 121. Protrusion 811A and protrusion 811B are inserted into recess 841A and recess 841B, respectively. An insertion direction of protrusion 811 with respect to recess 841 is the Y-axis direction. Center axis 910 of protrusion 811 and center axis 915 of recess 841 overlap each other while additive-manufacturing head 131 is coupled to tool spindle 121.

As illustrated in FIGS. 12 and 13, clamp mechanism portion 871 is configured to clamp recess 841 (841A, 841B) and protrusion 811 (811A, 811B) inserted into recess 841 (841A, 841B) to each other.

Clamp mechanism portion 871 includes a piston 875, a housing 872, a disc spring 876, and a plurality of balls 874. Piston 875, housing 872, disc spring 876, and the plurality of balls 874 are provided in tool spindle 121.

Piston 875 has a shaft shape extending around center axis 910. Piston 875 is slidable in the axial direction of center axis 910. Housing 872 has a tubular shape centered on center axis 910 and is fitted on an outer periphery of piston 875. Housing 872 has the protruding shape constituting protrusion 811.

A plurality of ball insertion holes 873 are made in housing 872. The plurality of ball insertion holes 873 are made at intervals in the circumferential direction of center axis 910. A plurality of balls 874 are arranged in each of the plurality of ball insertion holes 873, respectively. A recessed portion 878 is provided in piston 875. Recessed portion 878 has a shape recessed radially inward of center axis 910 from the outer peripheral surface of piston 875. Recessed portion 878 is provided at a position opposite to ball insertion hole 873 in the radial direction of center axis 910.

Disc spring 876 is disposed between piston 875 and housing 872 in the axial direction of center axis 910. Disc spring 876 applies elastic force in the +Y-axis direction to housing 872. An oil pressure chamber 877 is provided at a position adjacent to piston 875 in the −Y-axis direction.

Clamp mechanism portion 871 further includes a protrusion 879. Protrusion 879 is provided in additive-manufacturing head 131 (disk portion 136). Protrusion 879 has a protrusion shape protruding toward the inside in the radial direction of center axis 915 in recess 841.

As illustrated in FIG. 13, when oil pressure is supplied to oil pressure chamber 877, piston 875 slides in the +Y-axis direction against the elastic force of disc spring 876. At this point, when the positions of recessed portion 878 and ball insertion hole 873 coincide with each other in the axial direction of center axis 910, ball 874 falls into recessed portion 878. Thus, ball 874 retracts toward the radial inside of center axis 910 to obtain the state in which protrusion 811 can be inserted into and removed from recess 841.

As illustrated in FIG. 12, when oil pressure supply to oil pressure chamber 877 is stopped while protrusion 811 is inserted into recess 841, piston 875 slides in the −Y-axis direction by the elastic force of disc spring 876. At this point, as the positions of recessed portion 878 and ball insertion hole 873 are shifted in the axial direction of center axis 910, ball 874 is pushed by a wall surface of recessed portion 878.

Thus, ball 874 is pushed outward in the radial direction of center axis 910, and protrusion 879 is locked by ball 874. As a result, the state in which recess 841 and protrusion 811 inserted into recess 841 are clamped to each other is obtained.

The structure of the clamp mechanism portion is not particularly limited as long as the recess and the protrusion inserted into the recess can be clamped to each other.

As illustrated in FIGS. 8, 10, and 14, additive-manufacturing head 131 further includes a pin member 861, a guide block 862, a coupling plate 853, a coupling pin 854, and an air cylinder 852.

Pin member 861 is disposed on the opposite side of tool spindle 121 across the opposite plate 831 in the Y-axis direction. Pin member 861 has a pin shape extending around a center axis 920. Center axis 920 extends in a direction intersecting an insertion direction (Y-axis direction) of protrusion 811 with respect to recess 841. Center axis 920 extends in a direction orthogonal to the insertion direction (Y-axis direction) of protrusion 811 with respect to recess 841. Center axis 920 extends in the X-axis direction in a reference posture of tool spindle 121 in FIGS. 10 and 14.

Guide block 862 is attached to opposite plate 831. A guide hole 863 is made in guide block 862. Guide hole 863 is a through-hole penetrating guide block 862. Guide hole 863 penetrates guide block 862 in the X-axis direction in the reference posture of tool spindle 121 in FIGS. 10 and 14. Pin member 861 is inserted into guide hole 863. Guide block 862 supports pin member 861 so as to be slidable along the axial direction of center axis 920.

Air cylinder 852 includes a piston rod 856. Piston rod 856 is provided at a position shifted in the axial direction of center axis 920 and the direction orthogonal to center axis 920 (Y-axis direction) from center axis 920 on which pin member 861 extends. When air is supplied to air cylinder 852, piston rod 856 can move forward and backward in the axial direction of center axis 920 (the X-axis direction in reference posture of tool spindle 121).

Coupling pin 854 has a pin shape extending in the axial direction of center axis 920. Coupling pin 854 is connected to pin member 861. Coupling plate 853 has a plate shape extending in the direction (Y-axis direction) orthogonal to center axis 920, and is connected to coupling pin 854 and piston rod 856 at both ends of coupling plate 853, respectively.

Piston rod 856 is connected to pin member 861 through coupling plate 853 and coupling pin 854. As piston rod 856 in air cylinder 852 moves forward and backward, pin member 861 can move forward and backward in the axial direction of center axis 920. Pin member 861 is movable forward and backward in the X-axis direction in the reference posture of tool spindle 121 in FIGS. 10 and 14.

As illustrated in FIG. 10, additive-manufacturing head 131 (guide block 862) includes a first mating surface 866. First mating surface 866 extends along the insertion direction (Y-axis direction) of protrusion 811 with respect to recess 841. First mating surface 866 is parallel to the Y-axis-Z-axis plane in the reference posture of tool spindle 121 in FIG. 10. Guide hole 863 is open to first mating surface 866.

Pin member 861 is movable forward and backward between a first state (a state indicated by a pin member 861*j* in FIG. 10) in which pin member 861 is disposed on the back side of first mating surface 866 and a second state (a state indicated by a pin member 861*k* in FIG. 10) in which pin member 861 protrudes from first mating surface 866.

An opening 832 is provided in opposite plate 831. Opening 832 is a through-hole penetrating opposite plate 831 in the Y-axis direction. Pin member 861 in the second state (the state indicated by pin member 861*k* in FIG. 10) is opposite to the opening surface formed by opening 832 in the Y-axis direction. Pin member 861 in the first state (the state indicated by pin member 861*j* in FIG. 10) is retracted from the position opposite to the opening surface formed by opening 832 in the Y-axis direction.

An actuator moving pin member 861 forward and backward is not limited to air cylinder 852 described above, but for example, may be an oil pressure cylinder or an electric actuator.

As illustrated in FIGS. 8, 9, 11, and 14, tool spindle 121 further includes a block 821. Block 821 is attached to front surface portion 124. Block 821 has the protruding shape protruding in the +Y-axis direction on front surface portion 124. The protruding height of block 821 in the Y-axis direction is larger than the protruding height of protrusion 811 in the Y-axis direction. The protruding height of block 821 in the Y-axis direction may be less than or equal to the protruding height of protrusion 811 in the Y-axis direction.

Block 821 is inserted into opening 832 while additive-manufacturing head 131 is coupled to tool spindle 121. The insertion direction of block 821 with respect to opening 832 is parallel to the insertion direction of protrusion 811 with respect to recess 841. The insertion direction of block 821 with respect to opening 832 is the Y-axis direction.

A pin insertion hole 823 is made in tool spindle 121 (block 821). Pin insertion hole 823 has a hole shape capable of receiving pin member 861. Pin insertion hole 823 has the hole shape extending around center axis 925. Center axis 925 extends in the X-axis direction in the reference posture of tool spindle 121 in FIGS. 8 and 9.

Tool spindle 121 (block 821) includes a second mating surface 822. Second mating surface 822 extends along the insertion direction (Y-axis direction) of protrusion 811 with respect to recess 841. Second mating surface 822 is parallel to the Y-axis-Z-axis plane in the reference posture of tool spindle 121 in FIG. 9. Second mating surface 822 is parallel to first mating surface 866. Pin insertion hole 823 is open to second mating surface 822.

As illustrated in FIGS. 11 and 14, pin member 861 is inserted into pin insertion hole 823 while additive-manufacturing head 131 is coupled to tool spindle 121. The insertion direction of pin member 861 with respect to pin insertion hole 823 is a direction intersecting the insertion direction (Y-axis direction) of protrusion 811 with respect to recess 841. The insertion direction of pin member 861 with respect to pin insertion hole 823 is not parallel to the insertion direction (Y-axis direction) of protrusion 811 with respect to recess 841. The insertion direction of pin member 861 with respect to pin insertion hole 823 is the direction orthogonal to the insertion direction (Y-axis direction) of protrusion 811 with respect to recess 841. Center axis 920 of pin member 861 and a center axis 925 of pin insertion hole 823 overlap each other while additive-manufacturing head 131 is coupled to tool spindle 121.

Figure 15:
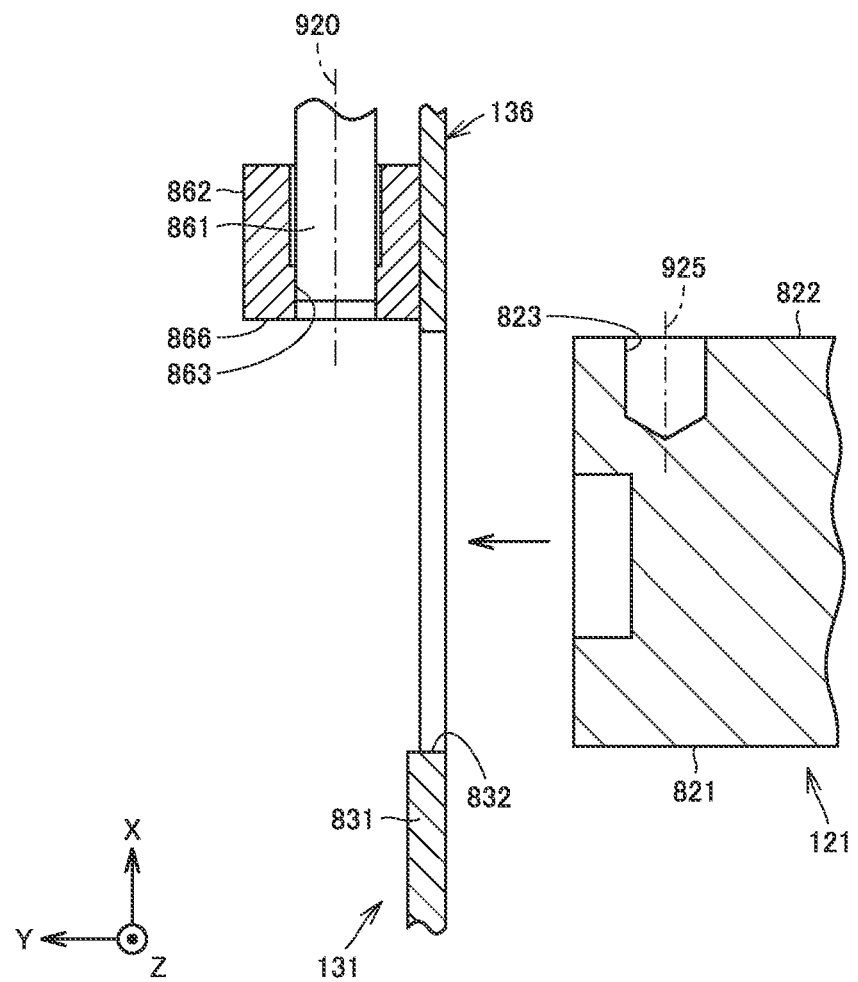
FIG. 15 is a sectional view illustrating a first step of a coupling operation between the tool spindle and the additive-manufacturing head.
Figure 16:
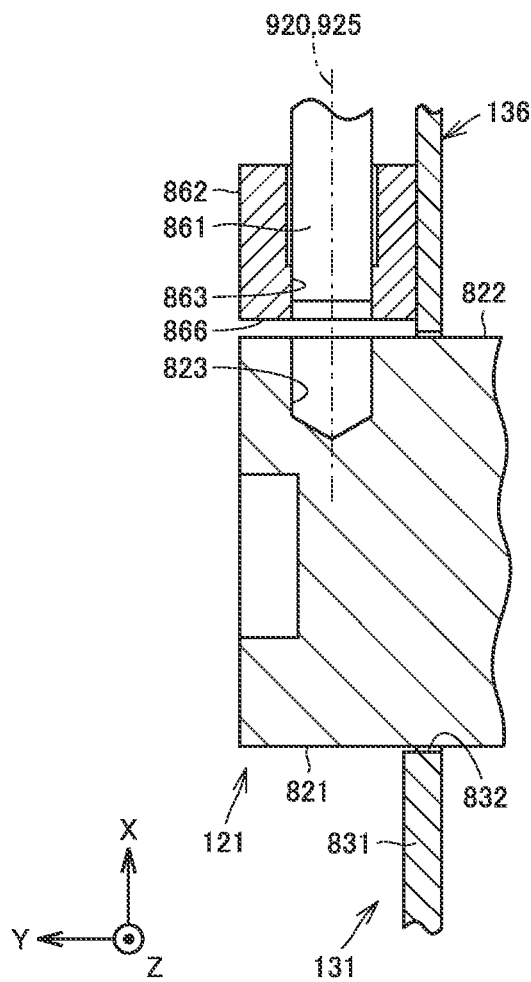
FIG. 16 is a sectional view illustrating a second step of the coupling operation between the tool spindle and the additive-manufacturing head.
Figure 17:
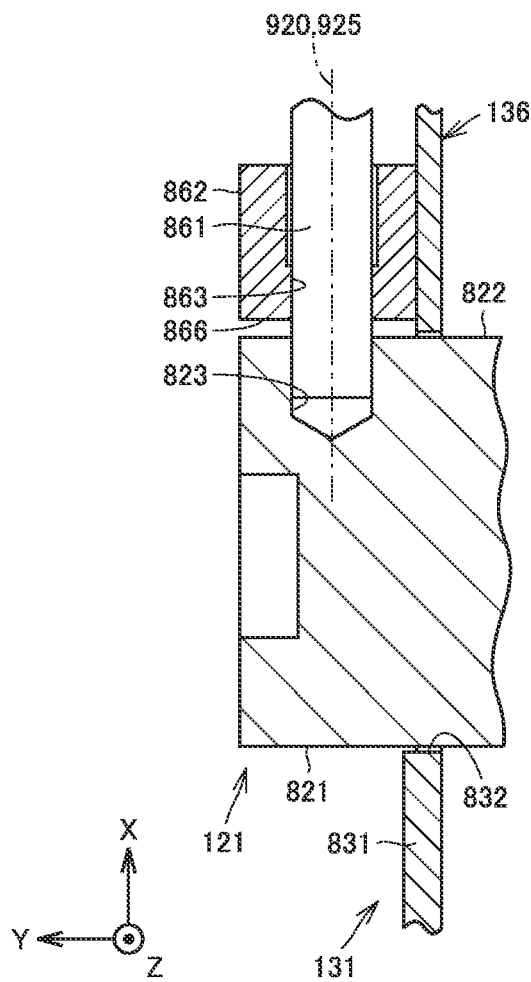
FIG. 17 is a sectional view illustrating a third step of the coupling operation between the tool spindle and the additive-manufacturing head.

FIGS. 15 to 17 are sectional views illustrating the coupling operation of the tool spindle and the additive-manufacturing head.

Referring to FIGS. 8 and 15, when additive-manufacturing head 131 is mounted on tool spindle 121, first, front surface portion 124 of tool spindle 121 and disk portion 136 of additive-manufacturing head 131 are disposed opposite to each other in the Y-axis direction by the movement of tool spindle 121 in a three-axis directions of the X-axis, the Y-axis, and the Z-axis and the movement of additive-manufacturing head 131 in the Z-axis direction. Tool spindle 121 is set as the reference posture.

When moving in the +Y-axis direction, tool spindle 121 approaches and moves toward additive-manufacturing head 131. Thus, block 821 is inserted into opening 832 while protrusion 811 (811A, 811B) is inserted into recess 841 (841A, 841B). At this point, as illustrated in FIG. 13, the oil pressure is supplied to oil pressure chamber 877 in clamp mechanism portion 871.

Referring to FIG. 12, when protrusion 811 is inserted into recess 841, the oil pressure supply to oil pressure chamber 877 is stopped. When protrusion 879 is locked by ball 874, recess 841 and protrusion 811 inserted into recess 841 are clamped to each other.

Referring to FIG. 16, when block 821 is inserted into opening 832, first mating surface 866 of guide block 862 and second mating surface 822 of block 821 face each other. Pin member 861 disposed on the back side of first mating surface 866 and pin insertion hole 823 opened to second mating surface 822 are opposite to each other in the X-axis direction. In the embodiment, first mating surface 866 and second mating surface 822 extend along the insertion direction (Y-axis direction) of protrusion 811 with respect to recess 841, so that first mating surface 866 and second mating surface 822 can be prevented from interfering with each other as tool spindle 121 moves in the +Y-axis direction.

Referring to FIGS. 14 and 17, next, pin member 861 is moved from the first state in which the pin member 861 is disposed on the back side of first mating surface 866 to the second state in which the pin member 861 protrudes from first mating surface 866 by the forward and backward movement of piston rod 856 in air cylinder 852. Thus, pin member 861 is inserted into pin insertion hole 823.

The insertion direction of pin member 861 with respect to the pin insertion hole 823 is the X-axis direction orthogonal to the insertion direction (Y-axis direction) of protrusion 811 with respect to recess 841, so that pin member 861 inserted into pin insertion hole 823 can function as a retainer even when a clamping failure is generated in clamp mechanism portion 871. Thus, additive-manufacturing head 131 can be more reliably prevented from falling off from tool spindle 121.

Referring to FIGS. 9 and 10, pin insertion hole 823 and pin member 861 (pin member 861k in the second state) inserted into pin insertion hole 823 are disposed on a straight line 960 connecting protrusion 811A (first protrusion) and recess 841A (first recess) into which protrusion 811A is inserted, and protrusion 811B (second protrusion) and recess 841B (second recess) into which protrusion 811B is inserted.

According to such the configuration, pin member 861 inserted into pin insertion hole 823 can more reliably prevent both protrusion 811A from coming out of recess 841A and prevent protrusion 811B from coming out of recess 841B.

When the structure of the clamp device of the embodiment of the present invention described above is summarized, the clamp device of the embodiment includes tool spindle 121 as the first member including protrusion 811 (811A, 811B), additive-manufacturing head 131 as the second member provided with recess 841 (841A, 841B) into which protrusion 811 (811A, 811B) is inserted in the first direction and detachably coupled to tool spindle 121, and clamp mechanism portion 871 that mutually clamps recess 841 (841A, 841B) and protrusion 811 (811A, 811B) inserted into recess 841 (841A, 841B). Additive-manufacturing head 131 as one member of tool spindle 121 and additive-manufacturing head 131 includes pin member 861. Pin insertion hole 823 into which pin member 861 is inserted in the second direction intersecting the first direction is provided in tool spindle 121 as the other member of tool spindle 121 and additive-manufacturing head 131.

According to such the configuration, when pin member 861 inserted into pin insertion hole 823 is caused to function as the retainer, even when a clamping failure occurs in the clamp mechanism portion 871, the coupling between tool spindle 121 and additive-manufacturing head 131 can be more reliably maintained.

In the embodiment, the configuration in which male-side protrusion 811 and male-side pin member 861 are provided in different members and female-side recess 841 and female-side pin insertion hole 823 are provided in different members has been described, but the present invention is not limited thereto, and the protrusion and the pin member may be provided in the same member, and the recess and the pin insertion hole may be provided in the same member. In addition, the clamp device of the present invention may be applied to the coupling between a pallet and a table or the coupling between the workpiece and a jig in the processing machine (machine tool), or may be applied to the coupling between different members in a technical field other than the processing machine (machine tool).

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

For example, the present invention is applied to a coupling structure between different members in the processing machine.

REFERENCE SIGNS LIST

100: processing machine, 110: processing area, 111: first workpiece spindle, 116: second workpiece spindle, 121: tool spindle, 122: spindle end face, 123: side surface portion, 124: front surface portion, 131: additive-manufacturing head, 132: head body, 133: laser tool, 136: disk portion, 141: automatic tool changer, 143: lifting arm, 144: double arm, 151: bed, 152: first longitudinal frame, 153: second longitudinal frame, 154: first transverse frame, 155, 312: rail, 156: rack, 161: saddle, 162: cross slide, 163: ram, 171: tool magazine, 181: splash guard, 191: laser tool storage portion, 192: head storage portion, 210: line body, 211: flexible tube, 211p: one end, 211q: the other end, 221: line body support, 222: servomotor, 311: second transverse frame, 320: first guide member, 321: linear guide, 323: cover body, 325: second guide member, 326: outer peripheral wall, 327: inner peripheral wall, 331: base, 332: pulley portion, 333: coil spring, 334: bracket, 335: tension applying mechanism, 336, 381, 821: block, 341: material powder supply device, 342: laser oscillation device, 351: slide cover, 352: line body insertion hole, 360: second guide mechanism, 370: first guide mechanism, 372: slider, 380: coupling mechanism, 382, 852: air cylinder, 501, 502, 503, 526: rotation axis, 504, 505: turning axis, 521: second revolving axis, 522: first revolving axis, 811, 811A, 811B: protrusion, 822: second mating surface, 823: pin insertion hole, 831: opposite plate, 832: opening, 841, 841A, 841B: recess, 853: coupling plate,

854: coupling pin, 856: piston rod, 861, 861*j*, 861*k*: pin member, 862: guide block, 863: guide hole, 866: first mating surface, 871: clamp mechanism portion, 872: housing, 873: ball insertion hole, 874: ball, 875: piston, 876: disc spring, 877: oil pressure chamber, 878: depression, 879: protrusion, 910, 915, 920, 925: center axis, 960: straight line

The invention claimed is:

1. A clamp device comprising:
 a first member including s a protrusion;
 a second member having a recess into which the protrusion is inserted in a first direction, the second member being detachably connected to the first member; and
 a clamp mechanism portion that mutually clamps the recess and the protrusion inserted into the recess,
 wherein
 one member of the first member and the second member includes a pin member,
 a pin insertion hole into which the pin member is inserted in a second direction intersecting the first direction is made in the other member of the first member and the second member,
 the first member includes a first protrusion and a second protrusion as the protrusion,
 a first recess into which the first protrusion is inserted and a second recess into which the second protrusion is inserted are provided as the recess in the second member, and
 the pin member and the pin insertion hole are disposed on a straight line connecting the first protrusion and the first recess, and the second protrusion and the second recess.

2. The clamp device according to claim 1, wherein the second direction is orthogonal to the first direction.

3. The clamp device according to claim 1, wherein
 the one member includes a first mating surface extending along the first direction,
 the other member includes a second mating surface that extends along the first direction and faces the first mating surface,
 the pin member is provided so as to be movable forward and backward between a first state in which the pin member is disposed on a back side of the first mating surface and a second state in which the pin member protrudes from the first mating surface, and
 the pin insertion hole opens to the second mating surface.

4. The clamp device according to claim 1, wherein one of the first member and the second member is a tool spindle, and
 the other of the first member and the second member is an additive-manufacturing head detachably attached to the tool spindle.

5. A processing machine comprising the clamp device according to claim 1.

* * * * *